US010384953B2

(12) United States Patent
Kovler et al.

(10) Patent No.: US 10,384,953 B2
(45) Date of Patent: Aug. 20, 2019

(54) SYSTEM AND METHODS FOR REMOVING IMPURITIES FROM PHOSPHOGYPSUM AND MANUFACTURING GYPSUM BINDERS AND PRODUCTS

(71) Applicants: TECHNION RESEARCH & DEVELOPMENT FOUNDATION LTD., Haifa (IL); VANDERBILT UNIVERSITY, Nashville, TN (US)

(72) Inventors: Konstantin Kovler, Nesher (IL); Boris Dashevsky, Haifa (IL); David Samuel Kosson, Brentwood, TN (US); Yonathan Reches, Nashville, TN (US)

(73) Assignees: TECHNION RESEARCH & DEVELOPMENT FOUNDATION LTD., Haifa (IL); VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 15/834,677

(22) Filed: Dec. 7, 2017

(65) Prior Publication Data
US 2018/0170766 A1  Jun. 21, 2018

Related U.S. Application Data

(63) Continuation of application No. 15/300,822, filed as application No. PCT/US2015/024061 on Apr. 2, 2015, now Pat. No. 9,868,647.
(Continued)

(51) Int. Cl.
C02F 1/46 (2006.01)
C01F 11/46 (2006.01)
(Continued)

(52) U.S. Cl.
CPC .............. *C01F 11/468* (2013.01); *B01D 9/00* (2013.01); *B01D 37/00* (2013.01); *C04B 22/144* (2013.01); *C01P 2002/88* (2013.01); *C01P 2004/03* (2013.01); *C01P 2006/44* (2013.01); *C01P 2006/80* (2013.01)

(58) Field of Classification Search
CPC ..... C01F 11/468; C04B 22/144; B01D 37/00; B01D 9/00; C01P 2006/80; C01P 2004/03; C01P 2002/88; C01P 2006/44
See application file for complete search history.

(56) References Cited

U.S. PATENT DOCUMENTS 4,035,269 A  7/1977  Mastrorilli
4,504,458 A  3/1985  Knudsen
(Continued)

OTHER PUBLICATIONS

International Search Report for PCT/US2015/024061 Completed May 15, 2015; dated Jun. 15, 2015 3 Pages.
(Continued)

*Primary Examiner* — Arun S Phasge
(74) *Attorney, Agent, or Firm* — The Roy Gross Law Firm, LLC; Roy Gross

(57) ABSTRACT

Methods and systems that remove impurities from phosphogypsum (PG), including from radium and heavy metal salts, and produce gypsum binders and products. In one embodiment, PG is reacted with a chloride solution in an acidic environment under mechanical manipulation and/or heat followed by galvanic and/or zeolite absorption removal of impurities.

10 Claims, 29 Drawing Sheets

Related U.S. Application Data

(60) Provisional application No. 61/974,137, filed on Apr. 2, 2014.

(51) Int. Cl.
  B01D 9/00 (2006.01)
  B01D 37/00 (2006.01)
  C04B 22/14 (2006.01)

(56) References Cited

U.S. PATENT DOCUMENTS

| | | |
|---|---|---|
| 5,736,608 A | 4/1998 | Cyrkiewicz et al. |
| 9,868,647 B2 * | 1/2018 | Kovler ................. C01F 11/468 |
| 2014/0030173 A1 | 1/2014 | Yokoyama et al. |

OTHER PUBLICATIONS

Written Opinion for PCT/US2015/024061 Completed May 15, 2015; dated Jun. 15, 2015 5 Pages.
International Report on Patentability for PCT/US2015/024061 Completed May 15, 2015; dated Jun. 15, 2015 5 Pages.

* cited by examiner

| Name of the | Ra | Th | U | Sn | Zn | Cd | Ni | Ca | $Fe^{2+}$/ $Fe^{3+}$ | Mg | Zn | Ba | Cu | Pb | $Cr^{2+}$/ $Cr^{3+}$ | Se |
|---|---|---|---|---|---|---|---|---|---|---|---|---|---|---|---|---|
| Chloride Solubility | 24.5 | 125 | * | 39.5 | 432 | 113.7 | 250 | 74.5 | $62.6^{2+}$/ $96.9^{3+}$ | 54.8 | 367 | 36.2 | 74.2 | 0.98 | * | 56.2 |
| Sulfate solubility | $2 \cdot 10^{-4}$ | 1.38 | 10.9 | 18.8 | 54.1 | 76.4 | 38.4 | 0.206 | $26.56^{2+}$/ $81.5^{3+}$ | 31.5 | 54.1 | 0.00022 | 20.5 | 0.0045 | 12.4/ 64 | 37.6 |
| Solubility ratio | 122500 | 90.6 | - | 2.1 | 8 | 1.488 | 6.51 | 361.65 | 2.36/ 1.18 | 1.74 | 6.78 | 81.818 | 3.62 | 217.8 | - | 1.49 |

* the data are not available, reacts with water, dissolved in acidic medium

Figure 3

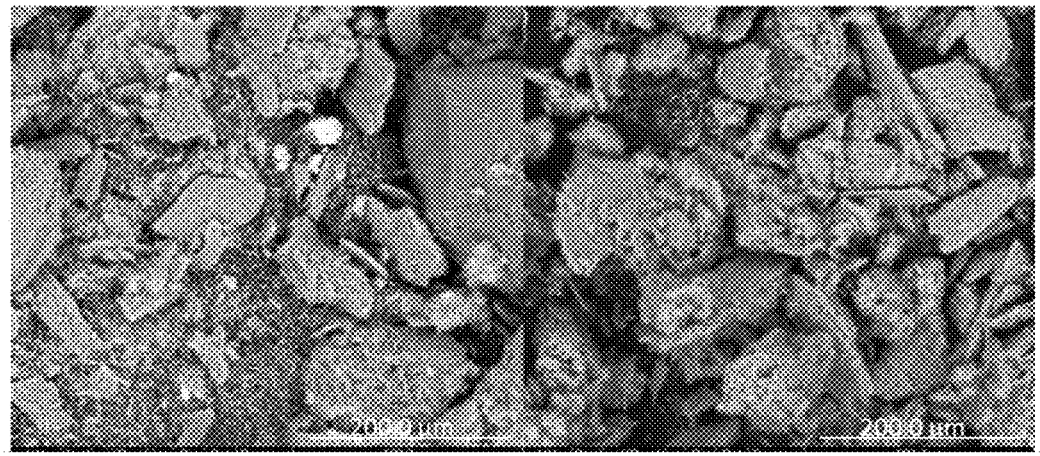
HV: 20.0 kV
Spot: 4.0
WD: 9.4 mm
Mag: 500X
Sig: BSE
Det: SSD
Pressure:---
HV: 20.0 kV
Spot: 4.0
WD: 9.5 mm
Mag: 500X
Sig: BSE
Det: SSD
Pressure:---
Figure 10A    Figure 10B
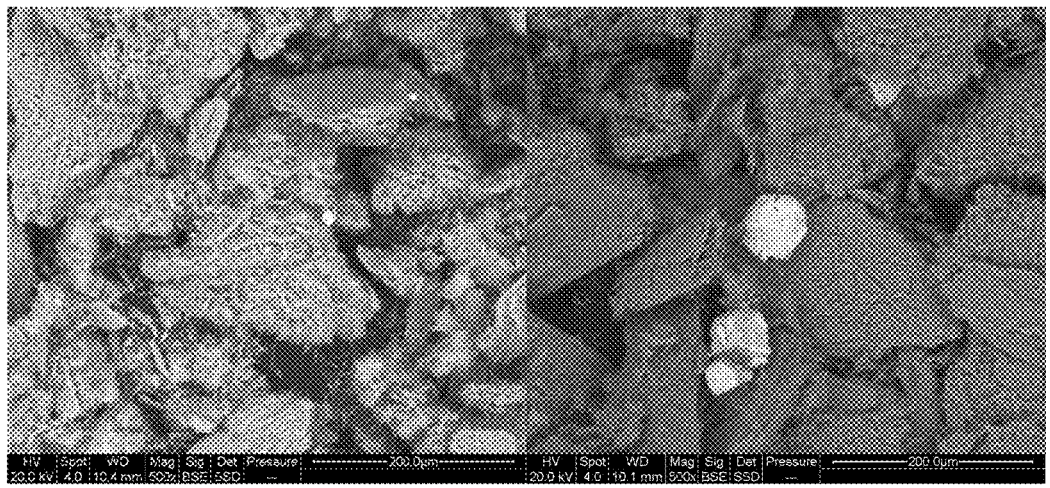
Figure 10C    Figure 10D

| Sample ID | Mass (g) | Mass of Sugar Added (g) | Count Time (hrs) | Date of Analysis | Bi-214 (Bq) | Bi-214 (Bq/kg) |
|---|---|---|---|---|---|---|
| RPG-source material | 100 | 0 | 48 | 5/16/2014 | 71.6 | 715.6 |
| RPG-L-A (unfiltered) | 100 | 0 | 48 | 6/16/2014 | 13.3 | 132.6 |
| RPG-L-B (unfiltered) | 100 | 0 | 48 | 6/20/2014 | 13.5 | 134.6 |
| RPG-M-A | 0.95 | 99.06 | 48 | 7/4/2014 | 0.32 | 343.1 |
| RPG-M-B | 0.92 | 99.15 | 48 | 7/1/2014 | 0.36 | 389.1 |
| RPG-B-A | 34.94 | 65.03 | 4 | 7/8/2014 | 7.42 | 212.4 |
| RPG-B-B | 34.39 | 65.58 | 4 | 7/1/2014 | 8.02 | 233.2 |

Figure 18A

| Sample ID | Mass (g) | Mass of Sugar Added (g) | Count Time | Date of Analysis | Bi-214 (Bq) | Bi-214 (Bq/kg) |
|---|---|---|---|---|---|---|
| LAPG-source material | 100 | 0 | 48 | 5/16/2014 | 80.3 | 801.6 |
| LAPG-L-A (unfiltered) | 100 | 0 | 48 | 6/23/2014 | 13.1 | 131.0 |
| LAPG-L-B (unfiltered) | 100 | 0 | 48 | 7/14/2014 | 12.3 | 122.9 |
| LAPG-M-A | 1.74 | 97.93 | 48 | 7/9/2014 | 0.79 | 451.7 |
| LAPG-M-B | 1.17 | 98.36 | 48 | 6/27/2014 | 0.51 | 438.5 |
| LAPG-B-A | 32.72 | 67.73 | 4 | 7/6/2014 | 8.37 | 255.8 |
| LAPG-B-B | 32.59 | 67.27 | 4 | 6/27/2014 | 7.30 | 224.0 |

Figure 18B

| | RPG-M-A | RPG-M-B* | RPG-B-A | RPG-B-B |
|---|---|---|---|---|
| pH | 2.02 | -- | 1.75 | 1.88 |
| Conductivity (mS/cm) | Sample Size Too Small | -- | 24.6 | 22.3 |
| Al | 3.74E+01 | -- | 3.31E+02 | 3.49E+02 |
| As | 1.21E-01 | -- | 4.67E-01 | 5.27E-01 |
| B | 4.43E-02 | -- | 2.42E-01 | 2.92E-01 |
| Ba | 2.35E-01 | -- | 3.29E+00 | 3.68E+00 |
| Be | 2.55E-02 | -- | 1.85E-02 | 2.40E-02 |
| Ca | 4.67E+03 | -- | 4.31E+04 | 4.63E+04 |
| Cd | 5.45E-01 | -- | 7.36E-01 | 8.03E-01 |
| Cs | 5.52E-03 | -- | below MDL | below MDL |
| Co | 3.42E-02 | -- | 3.66E-02 | 3.99E-02 |
| Cr | 1.56E+00 | -- | 1.38E+00 | 1.23E+00 |
| Cu | 3.05E-01 | -- | 1.04E+00 | 1.12E+00 |
| Fe | 4.43E+01 | -- | 5.00E+01 | 4.96E+01 |
| K | 7.63E+01 | -- | 3.81E+01 | 4.20E+01 |
| Li | 1.93E+00 | -- | 1.19E+00 | 1.28E+00 |
| Mg | 1.13E+00 | -- | 1.60E+01 | 2.03E+01 |
| Mn | 4.57E-01 | -- | 4.08E-01 | 3.57E-01 |
| Mo | 2.81E-01 | -- | 1.51E-01 | 1.57E-01 |
| Na | 3.74E+01 | -- | 3.39E+02 | 3.30E+02 |
| Ni | below MDL | -- | 4.10E-01 | 5.02E-01 |
| P | 4.38E+02 | -- | 2.47E+03 | 2.61E+03 |
| Pb | 2.51E-01 | -- | 2.55E-01 | 2.37E-01 |
| Re | below MDL | -- | below MDL | below MDL |
| S | 2.41E+03 | -- | 4.90E+03 | 4.72E+03 |
| Sb | 3.52E-02 | -- | 1.90E-02 | 1.84E-02 |
| Se | 5.47E-02 | -- | 2.97E-02 | 3.06E-02 |
| Si | 6.45E+02 | -- | 3.62E+02 | 3.72E+02 |
| Sn | 1.88E-02 | -- | below MDL | below MDL |
| Sr | 9.51E+00 | -- | 7.85E+01 | 8.28E+01 |
| Th | 2.33E-01 | -- | 8.77E-02 | 9.31E-02 |
| Ti | 1.46E+00 | -- | 1.32E+00 | 1.03E+00 |
| Tl | 3.27E-02 | -- | below MDL | below MDL |
| U | 4.91E+00 | -- | 3.97E+00 | 3.96E+00 |
| V | 1.33E+01 | -- | 9.67E+00 | 8.76E+00 |
| Zn | 5.12E-01 | -- | 7.73E+00 | 8.64E+00 |

Figure 19A

|  | LAPG-M-A | LAPG-M-B* | LAPG-B-A | LAPG-B-B |
|---|---|---|---|---|
| pH | 2.02 | -- | 1.9 | 1.9 |
| Conductivity (mS/cm) | 10.9 | -- | 14.2 | 14.6 |
| Al | 2.04E+02 | -- | 1.30E+02 | 1.23E+02 |
| As | 3.08E+00 | -- | 1.15E+00 | 1.06E+00 |
| B | 2.61E-01 | -- | 7.04E-02 | 7.08E-02 |
| Ba | 2.01E+00 | -- | 2.35E+00 | 2.11E+00 |
| Be | 1.11E-02 | -- | 1.09E-02 | 9.50E-03 |
| Ca | 5.50E+03 | -- | 1.85E+04 | 1.84E+04 |
| Cd | 2.00E-02 | -- | 3.15E-02 | 2.69E-02 |
| Cs | below MDL | -- | below MDL | below MDL |
| Co | 2.42E-02 | -- | 4.39E-02 | 3.53E-02 |
| Cr | 4.18E-01 | -- | 3.00E-03 | 2.57E-01 |
| Cu | 1.05E+00 | -- | 5.38E-01 | 4.71E-01 |
| Fe | 1.78E+02 | -- | 1.51E+02 | 1.42E+02 |
| K | 2.73E+01 | -- | 4.81E+01 | 4.39E+01 |
| Li | 3.71E-01 | -- | 3.60E-01 | 3.75E-01 |
| Mg | 4.93E+00 | -- | 2.36E+01 | 1.57E+01 |
| Mn | 3.97E-01 | -- | 3.25E-01 | 2.69E-01 |
| Mo | 8.31E-01 | -- | 4.88E-01 | 5.25E-01 |
| Na | 1.61E+01 | -- | 1.26E+02 | 1.24E+02 |
| Ni | 1.97E-01 | -- | 6.50E-02 | 5.81E-02 |
| P | 2.61E+02 | -- | 5.27E+02 | 5.12E+02 |
| Pb | 1.54E-01 | -- | 2.24E-01 | 1.95E-01 |
| Re | below MDL | -- | below MDL | below MDL |
| S | 1.71E+03 | -- | 6.29E+03 | 6.30E+03 |
| Sb | 8.14E-02 | -- | 5.34E-02 | 5.44E-02 |
| Se | 3.79E-02 | -- | 1.03E-02 | 1.08E-02 |
| Si | 5.48E+02 | -- | 4.05E+02 | 4.40E+02 |
| Sn | below MDL | -- | below MDL | below MDL |
| Sr | 2.84E+01 | -- | 3.06E+01 | 2.58E+01 |
| Th | 4.90E-02 | -- | 9.39E-02 | 8.45E-02 |
| Ti | 3.64E+00 | -- | 2.58E+00 | 2.21E+00 |
| Tl | 9.31E-03 | -- | 6.03E-02 | 5.93E-02 |
| U | 1.73E+00 | -- | 9.76E-01 | 1.02E+00 |
| V | 1.17E+00 | -- | 1.04E+00 | 1.04E+00 |
| Zn | 8.10E-01 | -- | 1.02E+00 | 9.20E-01 |

Figure 19B

|  | RPG-L | RPG-L-4 | RPG-L-7 | RPG-L-9 |
|---|---|---|---|---|
| initial pH | -0.24 | 4 | 7.2 | 9.3 |
| final pH* | -- | 1.9 | 5.1 | 8 |
| Al | 1.74E+05 | 4.85E+02 | 1.23E+02 | 1.36E+03 |
| As | 1.18E+02 | 2.59E+02 | 1.44E+02 | 1.21E+02 |
| B | 1.36E+02 | 3.12E+02 | 2.57E+02 | 1.23E+02 |
| Ba | 3.06E+03 | 2.58E+03 | 2.34E+03 | 2.25E+03 |
| Be | 6.52E+00 | below MDL | below MDL | below MDL |
| Ca | 7.97E+07 | 6.29E+07 | 6.29E+07 | 6.03E+07 |
| Cd | 2.83E+02 | 4.05E+02 | 3.54E+02 | 3.52E+02 |
| Cs | 3.06E+00 | 4.06E+00 | 3.71E+00 | 3.66E+00 |
| Co | 1.08E+02 | 4.65E+01 | 4.07E+01 | 1.30E+01 |
| Cr | 3.80E+02 | 5.40E+01 | 4.08E+00 | 3.87E+00 |
| Cu | 5.48E+03 | 1.63E+03 | 1.03E+03 | 1.35E+02 |
| Fe | 4.53E+03 | 1.93E+02 | 6.27E+01 | 1.49E+01 |
| K | 5.62E+04 | 5.92E+04 | 5.95E+04 | 5.51E+04 |
| Li | 4.05E+03 | 4.03E+03 | 4.01E+03 | 3.80E+03 |
| Mg | 2.39E+04 | 2.71E+04 | 2.62E+04 | 3.15E+04 |
| Mn | 7.77E+01 | 2.82E+02 | 2.60E+02 | 1.91E+01 |
| Mo | 3.68E+01 | 3.09E+00 | 2.60E+01 | 2.93E+01 |
| Na | 4.21E+05 | 1.64E+06 | 1.84E+06 | 1.89E+06 |
| Ni | 1.71E+03 | 2.94E+02 | 2.15E+02 | 2.17E+01 |
| P | 6.18E+05 | 5.63E+04 | 3.68E+03 | 1.86E+03 |
| Pb | 2.29E+02 | 2.96E+02 | 2.58E+02 | 1.66E+02 |
| Re | below MDL | 4.67E-01 | 3.48E-01 | 3.83E-01 |
| S | 1.17E+06 | 1.13E+06 | 1.15E+06 | 1.10E+06 |
| Sb | 6.00E+00 | 2.83E+00 | 5.40E+00 | 4.56E+00 |
| Se | 2.06E+02 | 8.22E+01 | 1.40E+02 | 1.18E+02 |
| Si | 3.17E+04 | 1.06E+04 | 3.33E+03 | 3.39E+03 |
| Sn | 5.85E+00 | 9.39E-01 | below MDL | below MDL |
| Sr | 4.83E+04 | 5.11E+04 | 5.00E+04 | 4.72E+04 |
| Th | 3.46E+01 | 7.60E+01 | 7.38E+01 | 5.82E+01 |
| Ti | 7.99E+01 | 4.50E+00 | 3.39E+00 | -1.31E+00 |
| Tl | below MDL | 7.14E-01 | below MDL | below MDL |
| U | 1.26E+03 | 2.88E+01 | 2.08E+01 | 8.46E+00 |
| V | 1.04E+03 | 5.94E+02 | 6.24E+02 | 5.71E+02 |
| Zn | 9.97E+03 | 1.03E+04 | 9.65E+03 | 1.20E+03 |

Figure 21A

|  | LAPG-L | LAPG-L-4 | LAPG-L-7 | LAPG-L-9 |
|---|---|---|---|---|
| initial pH | -0.29 | 3.8 | 7.1 | 8.9 |
| final pH* | -- | 2.4 | 5.5 | 6.7 |
| Al | 1.34E+04 | 3.66E+01 | 4.35E+01 | 8.72E+02 |
| As | 4.79E+02 | 5.21E+02 | 1.60E+02 | 1.38E+02 |
| B | 1.41E+03 | 1.31E+02 | 1.24E+02 | 1.08E+02 |
| Ba | 2.73E+03 | 2.60E+03 | 2.41E+03 | 2.39E+03 |
| Be | 1.52E+00 | below MDL | below MDL | below MDL |
| Ca | 6.48E+07 | 5.82E+07 | 6.00E+07 | 6.21E+07 |
| Cd | 4.79E+01 | 5.63E+01 | 5.62E+01 | 5.60E+01 |
| Cs | 5.53E+00 | 7.28E+00 | 7.48E+00 | 7.66E+00 |
| Co | 2.33E+02 | 1.56E+02 | 1.33E+02 | 2.75E+01 |
| Cr | 1.09E+02 | 2.80E+01 | 5.11E+00 | 4.72E+00 |
| Cu | 4.25E+02 | 5.49E+02 | 3.03E+02 | 1.54E+02 |
| Fe | 2.24E+04 | 2.85E+03 | 1.51E+02 | 3.66E+01 |
| K | 1.34E+05 | 1.66E+05 | 1.49E+05 | 1.81E+05 |
| Li | 3.59E+03 | 3.66E+03 | 3.95E+03 | 4.15E+03 |
| Mg | 2.01E+04 | 2.17E+04 | 2.14E+04 | 2.06E+04 |
| Mn | 3.98E+02 | 6.65E+02 | 6.21E+02 | 5.24E+01 |
| Mo | 1.15E+02 | 9.31E+00 | 9.69E+01 | 9.78E+01 |
| Na | 4.25E+05 | 1.31E+06 | 1.04E+06 | 1.56E+06 |
| Ni | 1.70E+03 | 5.07E+02 | 4.56E+02 | 9.06E+01 |
| P | 1.19E+05 | 3.60E+04 | 1.59E+03 | 9.84E+02 |
| Pb | 3.35E+02 | 4.22E+02 | 4.34E+02 | 3.16E+02 |
| Re | 6.95E-01 | 1.09E+00 | 1.04E+00 | 8.55E-01 |
| S | 9.66E+05 | 1.09E+06 | 1.03E+06 | 1.16E+06 |
| Sb | 9.36E+00 | 1.10E+01 | 1.09E+01 | 1.06E+01 |
| Se | 2.28E+03 | 1.30E+02 | 1.28E+02 | 1.28E+02 |
| Si | 1.87E+04 | 1.46E+04 | 2.39E+03 | 1.23E+03 |
| Sn | 1.10E+00 | below MDL | below MDL | below MDL |
| Sr | 2.05E+04 | 2.29E+04 | 2.24E+04 | 2.21E+04 |
| Th | 6.09E+01 | 7.44E+01 | 7.81E+01 | 5.65E+01 |
| Ti | 2.79E+01 | 1.13E+00 | 1.74E+00 | 1.17E+00 |
| Tl | 5.93E+01 | 1.09E+02 | 1.02E+02 | 6.41E+01 |
| U | 4.62E+02 | 1.31E+01 | 8.15E+00 | 6.30E+00 |
| V | 4.66E+02 | 5.80E+02 | 5.89E+02 | 5.73E+02 |
| Zn | 6.71E+02 | 1.10E+03 | 6.60E+02 | 4.19E+02 |

Figure 21B

SYSTEM AND METHODS FOR REMOVING IMPURITIES FROM PHOSPHOGYPSUM AND MANUFACTURING GYPSUM BINDERS AND PRODUCTS

CROSS-REFERENCE TO RELATED APPLICATIONS

This application is a U.S. continuation application, which claims the benefit of U.S. non-provisional patent application Ser. No. 15/300,822, filed on Sep. 30, 2016, which claims the benefit of a national stage application under 371 of PCT/US2015/024061 filed on Apr. 2, 2015, and claims the benefit of U.S. provisional patent application Ser. No. 61/974,137 filed on Apr. 2, 2014 having the title "System and Methods for Removing Impurities from Phosphogypsum and Manufacturing Gypsum Binders and Products," the disclosure of both applications are incorporated herein in their entirety.

BACKGROUND

Phosphogypsum (PG) is a waste product of the phosphate fertilizer industry from produced by the reaction of phosphate with sulfuric acid. Approximately 3 Mt are produced annually in Israel alone and up to 280 Mt globally. PG contains approximately 90% calcium sulfate dihydrate (gypsum). However, PG is contaminated with small amounts (<1%) of phosphoric acid left over from industrial processing, other chemical contaminants (most notably fluorides and regulated metals), rare earth elements, and radionuclides. Radium (Ra) is present at 600-1000 Bq/kg, which exceeds the legal limit allowed in construction materials in most developed nations. The use of PG as a construction material is currently impractical because of these contaminants. Indeed, approximately 82-85% of PG produced worldwide is dumped in stacks (i.e. landfill piles). As such, stacks pose an environmental and human health hazard primarily due to the contaminants, particularly Ra, and take up an increasing amount of potentially usable land.

Several solutions for the purification of PG have been tested successfully on a laboratory scale. One approach is to create phase changes in the calcium sulfate between the hemihydrate (HH) and dihydrate (DH) states. This allows purification of the PG from phosphates, but not from radionuclides, including Ra. Another approach is separation of the PG grains by size, as smaller grains generally contain a higher percentage of contaminants. Indeed, Ra in the fine (particle size<30 microns) PG fraction contains about 40% of the total Ra.

Radionuclides can also be removed by sulfuric acid extraction. However, due to their cost and inefficiencies, these and other approaches have not been successfully extended beyond the laboratory. As such, these approaches have failed to produce a breakthrough in the industry.

All known approaches of removing impurities, such as heavy metals and radionuclides, from PG are irreconcilable with the economy and the environment. In particular, the chemicals and the products of their neutralization, employed and generated by known approaches continuously pollute the environment. Moreover, no single approach can achieve chemical and radioactive purification simultaneously. Importantly, all current approaches yield, inter alia, a brine of contaminants, which cannot be utilized at present. In almost all situations these waste streams are discharged into the environment. Suffice it to say, despite significant efforts to develop a process that allows utilization of PG, there still exists a need for a method to remove impurities from PG and allow for its utilization that is practical and environmentally friendly on an industrial scale.

SUMMARY

Disclosed herein are methods and systems for removing impurities, particularly heavy metals and/or radionuclides, from PG. In one aspect, the method involves reacting PG with a chloride solution having a concentration greater than about 10% to form a PG sludge and dehydrating the PG sludge (also referred to herein as a PG reaction slurry) at a temperature ranging from about 20° C. to about 150° C. In some embodiments dehydrating the PG sludge can result in the formation of calcium sulfate hemihydrate crystals and/or a mixture of hemihydrate and anhydrite crystals and can contain, in some embodiments, some residual dehydrate crystals. In other embodiments, contaminants are removed from the PG sludge by galvanic processing. In some embodiments, reacting and/or dehydrating the PG with a chloride solution takes place under mechanical manipulation. In further embodiments, reacting the PG with a chloride solution takes place at an acidic pH.

In some embodiments the PG sludge is filtered into a solid fraction and a liquid waste fraction. In some embodiments, the solid fraction is neutralized using calcium carbonate. In some embodiments, insoluble phosphate salts are settled out to form a phosphate salt precipitate. In some embodiments, the phosphate salt precipitate is used in a phosphoric acid plant to produce phosphoric acid. In some embodiments the neutralized solid fraction is used to manufacture gypsum products. In other embodiments, the neutralized solid fraction is dried and used to manufacture gypsum or gypsum binders.

In additional embodiments, the solid fraction can contain calcium sulfate hemihydrate crystals and/or a mixture of hemihydrate and anhydrite crystals and can contain some residual dehydrate crystals. In further embodiments, the liquid waste fraction is further processed to remove impurities. In some embodiments, the liquid waste fraction is further processed by passing the liquid waste fraction through a molecular sieve. In other embodiments, the liquid waste fraction is further processed by isothermal settling or flotation. In further embodiments, the liquid waste fraction is further processed at ambient temperature to result in a fine solid fraction containing radionuclides and other impurities and a solution fraction. In some of these embodiments, the solution fraction is neutralized, which can result in a precipitant containing calcium phosphate phases and a remaining liquid waste fraction. In some embodiments, the calcium phosphate is used to produce phosphoric acid.

In another aspect, a system for removing impurities from PG contains a mill for reacting a concentrated chloride solution and PG to produce a PG reaction slurry, a reaction pool in fluid connection with the mill and is configured for dehydrating the PG reaction slurry, and a filter in fluid connection with the reaction pool and configured to separate a solid fraction from a liquid waste fraction, and a neutralization mixer in fluid connection with the filter. In some embodiments, the system contains a molecular sieve in fluid connection with the filter. In some embodiments, the reaction pool contains a cathode and an anode for galvanic removal of impurities from the reaction slurry. In some embodiments, the system contains a scrubber that is in fluid connection with the mill to purify vapors produced in the mill. Other embodiments contain a neutralization pool containing lime and/or carbonate powder that is in fluid connection with the scrubber.

In some embodiments, the system contains a container in fluid connection with the mill, wherein the container contains a chloride solution at a concentration of about 15% to about 20%. Other embodiments contain a vibrating screen configured for filtering physical debris from a solution containing PG, wherein the vibrating screen is in fluid connection with the mill. Additional embodiments contain a streamed mixer configured for mixing a solution containing PG, wherein the streamed mixer is in fluid connection with the vibrating screen. In some embodiments, the system contains a gravimetric feeder configured for weighing and delivering PG to the streamed mixer, wherein the gravimetric feeder is operatively coupled to the streamed mixer.

Other compositions, methods, systems, features, and advantages of the present disclosure will be or become apparent to one with skill in the art upon examination of the following drawings and detailed description. It is intended that all such additional compositions, methods, systems, features, and advantages be included within this description, and be within the scope of the present disclosure.

BRIEF DESCRIPTION OF THE DRAWINGS

FIG. 3 is a table showing solubility of various elements when complexed with sulfate or chloride.

FIG. 4A: Louisiana, United States, and FIG. 4B: Rotem, Israel. The vertical axis shows radium activity in purified PG expressed in Bq/kg. The horizontal axis shows percent $CaCl_2$ in solution. Diamonds indicate observations measured at an acidic pH. The triangle indicates the observations made after neutralizing the pH to 7.7 (FIG. 4A) or 8.0 (FIG. 4B).

FIG. 5 shows the gamma ray spectra before and after treatment with concentrated chloride at various temperatures. The vertical axis shows counts per second. The horizontal axis shows energy in keV. The top data line represents the gamma ray spectrum of raw PG. The second data line from the top represents the gamma ray spectrum from PG processed at 30 degrees Celsius. The third data line from the top represents the gamma ray spectrum from PG processed at 125 degrees Celsius. The bottom data line represents the gamma ray spectrum from PG processed at 93 degrees Celsius.

FIGS. 10A-10D show SEM photomicrographs of PG treated in 40% $CaCl_2$ solution at about 90° C. and L/S=1 under 500× magnification for about 15 minutes (FIG. 10A), 30 minutes (FIG. 10B), 60 minutes (FIG. 10C), or 120 minutes (FIG. 10D).

FIG. 14 shows a flow diagram demonstrating the general technological scheme and example inputs and outputs for the methods and systems described herein that can be adapted for use on an industrial scale. *indicates that mass transfer of water depends on the temperature and humidity at the location and environment that the methods and systems described herein are operated in.

FIG. 16B was obtained after about 4 h of settling.

FIG. 16B was obtained after about 4 h of settling.

FIGS. 18A-18B demonstrate the activity data of Rotem PG (FIG. 18A) and Louisiana PG (FIG. 18A) source material and fractions thereof.

FIGS. 19A-19B demonstrate the concentration data (expressed in mg/kg) from Neutralization of Solid Fractions. * in FIG. 19A denotes RPG-M-B was used in gamma analysis. * in FIG. 19B LAPG-M-B was used in gamma analysis.

FIGS. 21A-21B demonstrate the concentration data (expressed in µg/L) from neutralization of the liquid fraction. * indicates the final pH measured after about 18 h after initial pH measurement.

DETAILED DESCRIPTION

Discussion

Many PG impurities, including Ra and other contaminants, are contained within the calcium sulfate dihydrate (gypsum) crystal lattice. Further, many of these impurities, including Ra, are poorly soluble. One reason that previous methods have failed to remove Ra and other contaminants, is that the previous methods do not penetrate the PG crystal structure to gain access to the contaminants and adequately solubilize the contaminants, particularly Ra, to allow for their removal.

In contrast, the methods and systems described herein can utilize chloride extraction in an acidic aqueous medium, which can be carried out in combination with mechanical manipulation and/or heat to remove chemical and radionuclide contaminants from the PG. In this way, chloride ions can penetrate the crystal lattice and form complexes with the contaminants, particularly Ra. Unlike contaminant-sulfate complexes, the contaminant-chloride complexes are highly-soluble, and therefore, remain in solution upon recrystallization of the gypsum or other calcium sulfate-based crystal lattice. Additional filtering, separation steps, and/or neutralization of the waste stream can allow heavy metals and phosphorus to be recovered and recycled instead of being discarded into the environment.

As such, the methods and systems described herein can provide a practical industrial and environmentally friendly way to remove impurities from PG to generate usable gypsum for the production of construction materials, such as gypsum binders and building products. As used herein, "environmentally friendly," as used herein, refers to systems and methods of managing and utilizing PG, that are less detrimental to the environment than current systems and methods of managing and utilizing PG. The purified PG from the methods described herein can be environmentally friendly in that it can contain a reduced level of contaminants (including Ra) such that products produced from this PG can be used to make products with less than or equal to the amount of contaminants currently present in equivalent products not produced by the methods and systems described herein. The embodiments disclosed herein can utilize chloride extraction, thermal, and mechanical manipulation, and galvanic processing to remove and recover impurities, including chemicals and radium, from PG making it suitable for use for, inter alia, construction materials. Although the systems and methods disclosed herein are described as removing impurities in PG directly from effluent from phosphoric acid plants and from PG stacks, the disclosure encompasses the purification of any source of PG using the systems and methods described herein.

Figure 1:
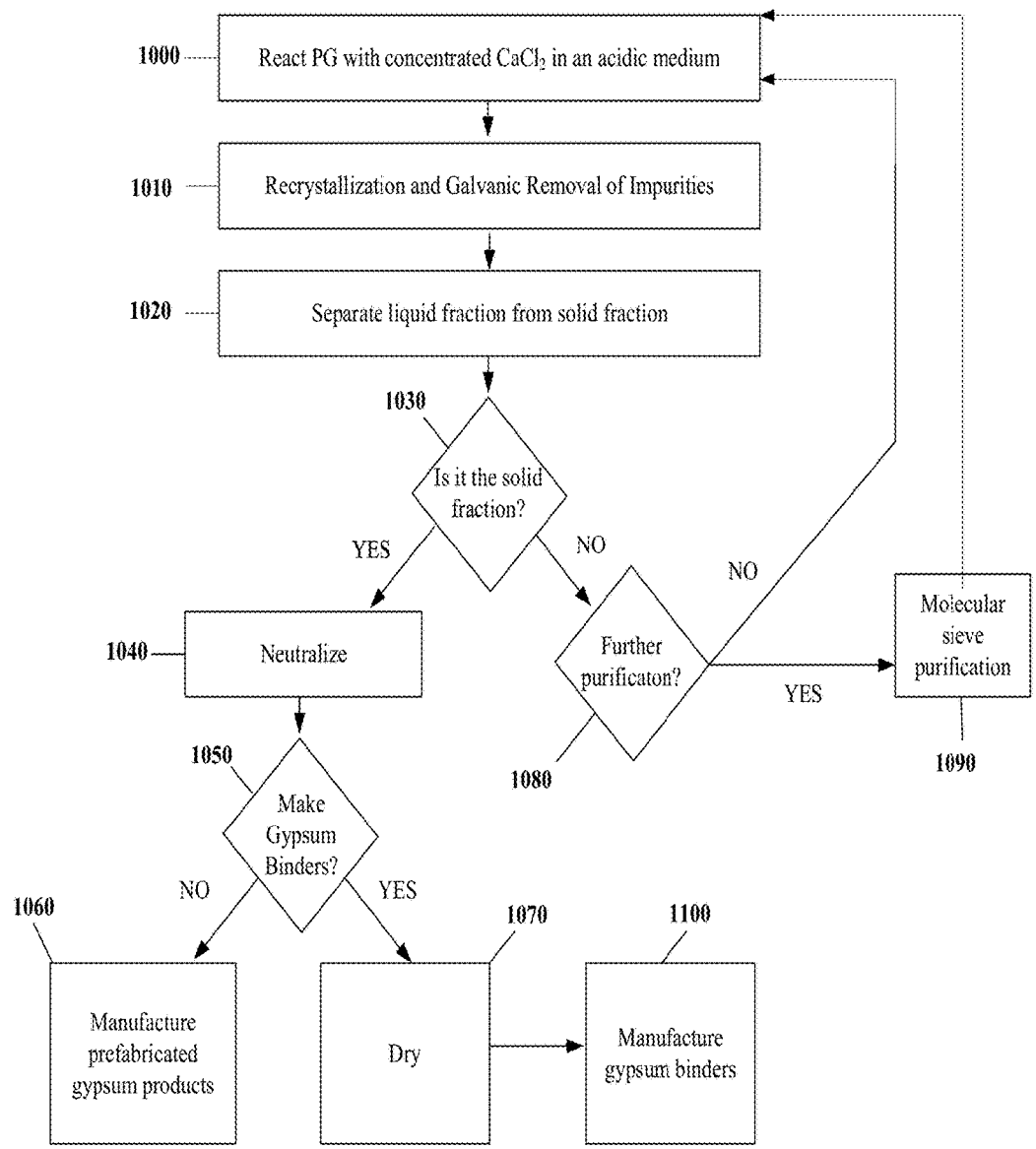
FIG. 1 is a flow diagram depicting one embodiment of a method for removing impurities from phosphogypsum (PG) directly from effluent from a phosphoric acid plant.

With this in mind, attention is directed to FIG. 1, which is a flow chart illustrating the general steps in a method for purifying PG. PG is reacted, in step 1000, with a concentrated chloride solution for about 5 minutes to about 365 days. Please confirm or correct range. As used herein, "about," "approximately," and the like, when used in connection with a numerical variable, generally refers to the value of the variable and to all values of the variable that are within the experimental error (e.g., within the 95% confidence interval for the mean) or within ±10% of the indicated value, whichever is greater. In some embodiments, the reaction with the concentrated chloride solution can be from 5 minutes to about 48 h or from about 1 d to about 365 d. In some embodiments, the time for the reaction between PG and the concentrated chloride solution can be about 15 min, about 30 min, about 60 min, or about 120 min.

The chloride solution can be any solution in which chlorine is present and is able to form chloride ions available to form salts (e.g. simple or complex chloride salts) with other compounds that can be introduced into or are present in the solution. In some embodiments, the chloride solution is calcium chloride ($CaCl_2$). Other suitable chloride solutions include, but are not limited to, magnesium chloride and potassium chloride.

PG can come from any source including, but not limited to, PG-containing slurry (PG slurry) flowing directly from a phosphoric acid plant or from PG stored in stacks. The PG slurry can be made by combining PG and a suitable liquid. Suitable liquids include, but are not limited to, water, salt water, and brine. The brine or salt water can be obtained from the sea, or other natural source. The brine can contain calcium sulfate and/or chloride. Other compounds can be added to the PG slurry, including but not limited to chloride salt or chloride brine.

The concentration of the chloride solution can range between about 1% and about 60% w/w. For example, in some embodiments the concentration is between about 10% and about 60% w/w. In other embodiments the concentration is between about 40% and about 60% w/w. In one embodiment, the most economical concentration of chloride solution is used. As used in this context "economical" describes operating with substantially no monetary or physical input waste or operating at a monetary or physical input savings. The water to solid ratio can range from about 1:1 mass/mass to about 1:10 mass/mass.

Contaminants responsible for pigmentation, such as Fe and Mn, can be effectively removed under a temperature of about 90° C. at 40% w/w $CaCl_2$ and an acidic pH varying from between about −1.5 to about 1. At these conditions more than about 86% of Fe and about 44-52% of Mn is removed. Further, at these conditions purification from fluorides is especially effective with about 98% of F being removed. Other contaminants, such as Th, U, Cd, and Co have decreased in PG purified under these conditions (about 62-70%, about 58-96%, about 45-88% and about 47-95%, respectively) removal at 40% concentrations of $CaCl_2$, as compared to removal at lower concentrations of $CaCl_2$.

Further, the microstructure of the solid phase PG is affected by the chloride solution concentration. For example, a transformation of the microstructure is observed at a concentration of about 20% or greater w/w $CaCl_2$. The transformation suggests that a dehydrative phase change of the calcium sulfate dehydrate occurring at or below about 90° C. starts at a minimum $CaCl_2$ concentration between about 10% and about 20% w/w. A similar transformation has been observed at about 35° C. at a $CaCl_2$ concentration of about 40% w/w. The transformation can facilitate the production of a cementitious binder (anhydrite or hemihydrate; e.g. alpha-hemihydrate).

The reaction between the PG and concentrated chloride solution can be carried out at any temperature from ambient temperature (about 20° C.) to about 150° C. In some embodiments, the reaction in the chloride solution (1000) is conducted under heated conditions, where the temperature ranges anywhere from about 85° C. to about 150° C. In other embodiments, the reaction is conducted at a temperature of about 90° C. In other embodiments, the reaction is conducted at a temperature of about 120° C. In some embodiments, the reaction can be conducted at temperatures less than about 85° C. In one embodiment, the concentration of the chloride solution is about 40% and the reaction is conducted at about 90° C. In another embodiment, the concentration of the chloride solution is about 40% and the reaction is conducted at about 120° C. In one embodiment, the concentration of the chloride solution is about 60% and the reaction is conducted at about 90° C. In another embodiment, the concentration of the chloride solution is about 60% and the reaction is conducted at about 120° C. In other embodiments, the concentration of chloride solution can be about 40% and the reaction with PG is conducted at about 20-40° C. In some embodiments, the concentration of the chloride solution is about 40% and the reaction with PG is conducted at about 30° C. The liquid-to-solid ratio selected for the reaction of PG and concentrated chloride solution can range from 1:1 to 10:1 (mass/mass). One of skill in the art will appreciate that the specific liquid to solid ratio can be selected to optimize the reaction conditions for convenience of mixing and mechanical handling.

The reaction between the PG and concentrated chloride solution can be carried out at any pH. In some embodiments the reaction is conducted at an acidic (pH<6) pH. In other embodiments, the pH ranges from about 1 to about 6. In further embodiments, the pH ranges from about 1 to about 3. This is because removal of several contaminants is pH dependent. For example, removal of P, Cr, Fe, and Mn is greater in solutions with an acidic pH, whereas Ra can be removed at any pH.

In other embodiments, the reaction (1000) of PG with the concentrated chloride solution is combined with mechanical manipulation. Mechanical manipulation as used herein encompasses the physical movement of, or part of, a solid, liquid, or gaseous composition by non-human means. For example, mechanical manipulation can be grinding, stirring, agitating, mixing, pumping with or without recirculation, shaking, or combinations thereof by non-human means generally known. Mixing can be also achieved by pumping with or without recirculation (i.e., by a centrifugal pump). In some embodiments, mixing can be performed by a recirculation pump. In some embodiments, for example those that are conducted for longer periods of time at lower temperatures; less aggressive methods of mixing (such as a recirculating slurry pump) can be used. This can also facilitate simultaneous particle size reduction (coupled pumping and grinding). Mechanical manipulation can effectively peel the dehydrated surface layers of the gypsum crystals within the reaction slurry and accelerates dehydration. Mechanical manipulation in combination with thermal recrystallization can create a condition for maximal contact of the solid phase PG with the concentrated chloride solution to facilitate solubilization of contaminants contained within the gypsum crystal lattice.

After reacting PG with a concentrated chloride solution (1000), in some embodiments, the reaction slurry is allowed to recrystallize (1010) into the alpha-hemihydrate state. Recrystallization is optionally accompanied, at a cathode, by galvanic removal (1010) of metals and contaminants with a lower electrode potential than hydrogen (e.g. Au, Ag, Cu, Bi, Pb, Sn, Cd, Co, Ni, Fe, Zn, Mn, W, Cr, and the like). Suitable materials for the cathode and an anode are known in the art. In some embodiments, the anode is made of graphite or carbon. The D.C. voltage applied to the reaction slurry can range from about 1 to about 10 V, but is preferably 5 V. Optionally, the reaction slurry is stirred during recrystallization and galvanic removal of impurities. Stirring helps transport discharging cations to the cathode surface and increases the productivity of the galvanic process. In some embodiments, recrystallization and galvanic removal of impurities takes about 2 to about 5 hours.

After recrystallization and optional galvanic removal of impurities (1010), in some embodiments, the solid fraction is separated from the liquid fraction (or waste stream) in step 1020. In other embodiments, the solids are separated from the liquids by press filtering or centrifugation. In some embodiments, the slurry is diluted with boiling (about 100° C. at standard temperature and pressure). In some of these embodiments, the slurry can be diluted to a ratio of 1:3 mass/mass (water to slurry). In further embodiment, the water to slurry ratio can range from about 1:1 to about 10:1 mass/mass (water:slurry). The slurry can then be filtered via press filtering resulting in a filtered solid fraction. In some embodiments, the filtered solid fraction is re-diluted with boiling water and filtered again as previously described. This cycle of diluting and re-filtering the filtered solid fraction can be repeated as necessary. In some embodiments, the cycle of diluting and re-filtering the solid fraction can be repeated from 1 to 10 times. The temperature of the slurry and filtered solid fraction during this filtering and re-filtering process can be kept at about 100° C. to about 140° C. In further embodiments, the solid fraction and liquid fraction can be separated by continuous filtration. In these embodiments, the slurry is kept at about 100° C. to about 140° C. during filtering. In some embodiments, filtering is conducted under pressure. In these embodiments, the pressure can range from about 2 to about 4 bars.

Separation of the solid and liquid fraction can also occur without the use of compression to increase the rate of filtration. In these embodiments, the slurry can be optionally diluted with boiling water as described above. The slurry or diluted slurry can then be allowed to pass through a filter in the absence of external compression to form the filtered solid fraction. The temperature of the slurry during filtering can be kept at about 100° C. to about 140° C. The filtered solid fraction can then be re-diluted with boiling water to about 15% w/v. The re-diluted filtered solid fraction can be re-filtered as before. This cycle of diluting and re-filtering can be repeated as many times as necessary. In some embodiments, this cycle is repeated 1 to 10 times. In other embodiments, the cycle is repeated as many times as necessary so as to remove residual reaction solutions, obtain a material (solid fraction) with minimal chloride content, and/or obtain a material with minimal residual contaminants. Other suitable separation methods are generally known in the art. In embodiments where the solid fraction is washed with water, residual water can be removed by evaporation by natural (e.g. solar heat/energy) or artificial methods (e.g. artificial heat) generally known by those of skill in the art.

In some embodiments, the solid can be separated or filtered at temperatures from ambient (i.e. about 20° C.) to about 60° C. In some embodiments, separation of the solids can be conducted by settling at a temperature ranging from about 20° C. to about 60°.

In some embodiments, during separation of the solids a suitable gypsum retarder can be used to minimize the hydration of calcium sulfate binder phases into calcium sulfate dihydrate. Suitable gypsum retarders include, but are not limited to, acetone, methyl alcohol, ethyl alcohol, propyl alcohol, isopropyl alcohol, acetic acid, citric acid, and tartaric acid. Other suitable gypsum retarders will be appreciated by those skilled in the art. In some embodiments, citrogypsum can be a source of citric acid. The gypsum retarder can be added at various stages of the PG purification processes described herein. The gypsum retarder can be added to the solid fraction obtained after the reaction of PG with the concentrated chloride solution and/or dehydration. The gypsum retarder can be added to the solid fraction during filtering the PG sludge or solid fraction. The gypsum retarder can be added to the water used during the filtering process to wash the solid fractions. Other points in the process where the gypsum retarder can be added will be appreciated by those in the art. The gypsum retarder can be removed by evaporation from the solids or other methods generally known in the art. Calcium hydroxide or other suitable base can be added to the dried solid purified product to minimize or prevent any negative effect the gypsum retarder may have on the setting of the gypsum binder produced from the purification process(es) described herein.

After separation of the solid and liquid portions (1020), the solid portion can be optionally washed. In some embodiments, the solid fraction is washed under pressure with a washing solution to remove residual reaction solution from the calcium sulfate and/or calcium hemihydrate crystals. Additionally, washing under pressure further facilitates forcing the reaction solution out of the inter-granular space of the calcium sulfate and/or calcium sulfate hemihydrate crystals. For some embodiments, the washing solution is the same solution used in the subsequent step to neutralize the solid fraction.

After separation of the solid and liquid portions (1020) or the optional washing of the solid fraction, the solid fraction containing the calcium sulfate and/or hemihydrate calcium sulfate is neutralized in step 1040. In some embodiments, the solid fraction is mixed with calcium oxide (lime). In some embodiments, the calcium oxide solution is provided as a powder that is subsequently hydrated. The heat produced from hydration of the calcium oxide aids in the neutralization reaction (1040). As the remaining acids, primarily phosphoric acid, are neutralized, they are transformed into insoluble compounds. In other embodiments, an excess of calcium oxide can be mixed with a colloid solution of silicon acid and introduced into the neutralization reaction (1040) to make the gypsum products water-resistant or water-proof. Some embodiments allow for recovery of $P_2O_5$, which is lost in PG. In some embodiments, $P_2O_5$ lost in PG can be recovered and returned to the phosphoric acid plant. Recovery of $P_2O_5$ is executed by neutralization using carbonate powder or lime, settling the insoluble calcium phosphate salts and their further return to the phosphoric acid plant.

After neutralization (1040), optionally, if gypsum binders are to be manufactured (1050), the solid fraction is dried (1070). This produces gypsum binder (1100). In other embodiments, the solid fraction is not dried, but rather is molded into prefabricated gypsum products (1060).

While the solid fraction is being further processed, as previously discussed, the liquid fraction is optionally further processed. During the process of reacting with a concentrated chloride solution (1000), recrystallization and optional galvanic removal of impurities (1010), and separation of the liquid fraction from the solid fraction (1020), the liquid fraction accumulates radionuclides and other impurities. So long as the liquid fraction has capacity to accumulate additional impurities, it can be recycled and directed back into the process at the concentrated chloride reaction step (1000), without further purification.

However, if the liquid waste fraction does not have capacity to accumulate additional impurities, or if it is otherwise desirable to do so, the liquid fraction can be further purified by removal of impurities (1080). In some embodiments the liquid waste fraction is passed through a molecular sieve (1090) such as a zeolite, ionic exchange resin, an aluminosilicate mineral, a silica gel, and combinations thereof In embodiments employing a zeolite, the ratio of silica to aluminum in the zeolite can range from about 1:1 to about 1:10 (mass/mass). In some embodiments the zeolite is a low silica zeolite and has a silica aluminum ratio of about 1:1 (mass/mass). In other embodiments, the liquid waste fraction is passed through a zeolite (1090) having an intermediate silica to aluminum ratio of about 1:4 (mass/mass). In further embodiments, the zeolite is a high silica zeolite and has a silica to aluminum ratio of about 1:10 (mass/mass). For the absorption of heavy and radioactive metals zeolite materials, such as mineral clinoptilolite or its synthetic analogue produced from tuff with a silica to aluminum ratio of about 1:4 (mass/mass) up to about 1:1 (mass/mass). Preferably, the zeolite is a synthetic zeolite. In some embodiments, the zeolites include clinoptilolite or its synthetic analogue. The zeolite can include other suitable compounds generally known in the art. Zeolites selectively absorb Rb, Ce, Sr, Co, Ba, Ca, Cr, U, Ra, Th, and other radioactive elements, or combinations thereof.

In other embodiments, the liquid fraction is purified by passing the liquid fraction through a powder layer of specially selected aluminosilicate mineral. In some embodiments, the aluminosilicate natural mineral is clinoptilolite. In further embodiments, ion exchange resins are employed to remove various heavy metals from the liquid fraction. Heavy metals removed by ion exchange resins are subsequently recovered and reused by regeneration of the resin. The ion-exchange resins can be natural or synthetic resin. In further embodiments, a silica gel or other molecular sieve can be used to filter the liquid fraction to absorb heavy metals. After optional purification of the liquid fraction, the purified liquid fraction is reused in the process of purifying PG.

In a further embodiment, purification of the liquid waste fraction is achieved by precipitation. Precipitation of heavy metals and other contaminants out or the liquid waste fraction can occur by pH adjustment and by the addition of aluminum chloride or ferric chloride or Alum ($KAl(SO_4)_2 \cdot 12H_2O$).

Figure 2:
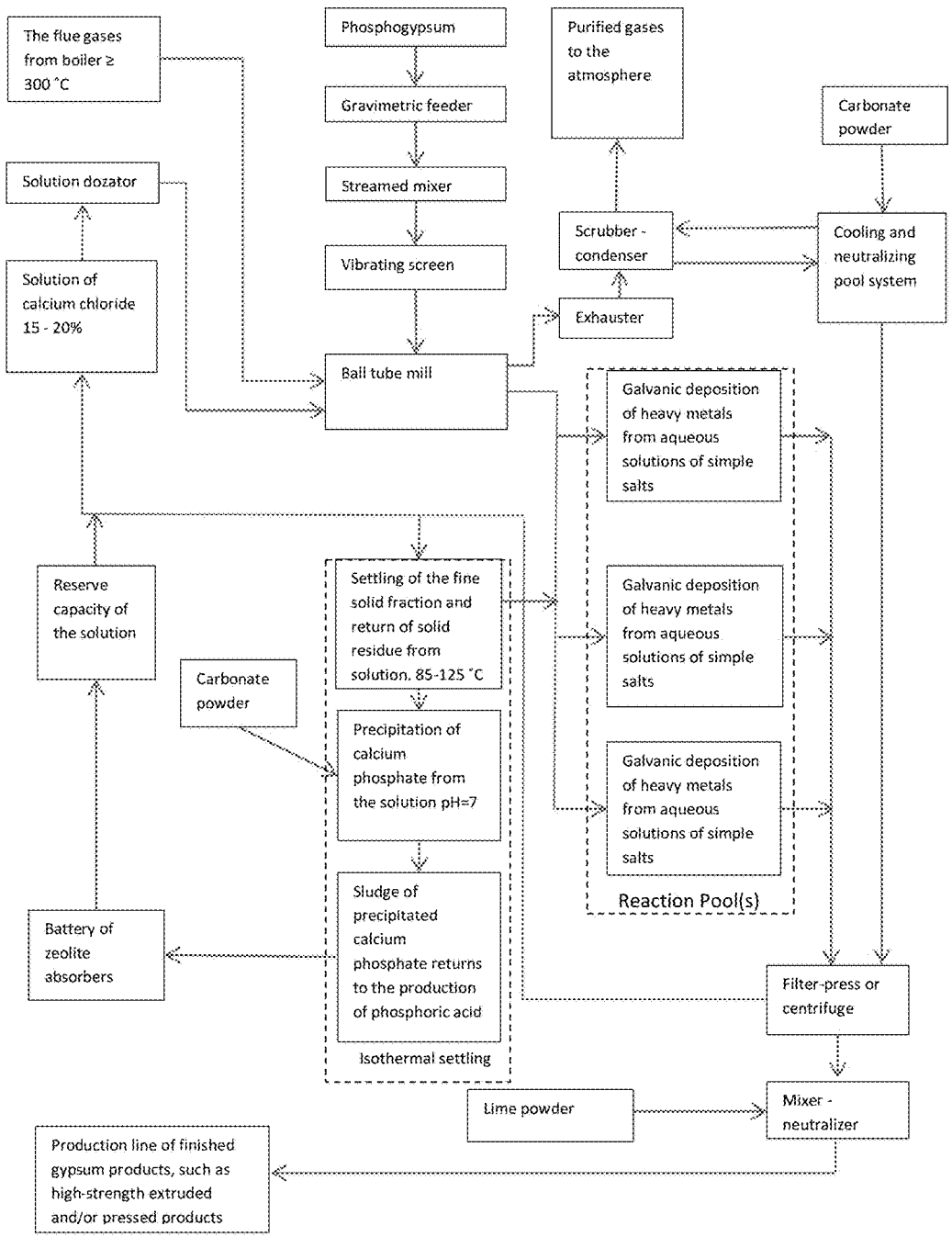
FIG. 2 is a flow diagram depicting one embodiment of a system for removing impurities from PG from a PG stack.

With the general PG purification process in mind, attention is now directed to FIG. 2, which is a flow diagram depicting one embodiment of a system for purifying PG and manufacturing gypsum binders and products. In this embodiment, PG from a stack and a dilute chloride solution, preferably $CaCl_2$, are metered by weight using a gravimetric feeder and a streamed mixer. In some embodiments, the dilute chloride solution contains about 15% to about 20% w/w $CaCl_2$. The resulting suspension is cleared of physical debris (e.g. stone, metal, wood, and vegetation) by passing the suspension through a vibrating screen and being crushed and ground. The cleared suspension is then passed, preferably sprayed, into a mill. In some embodiments, the mill is a tube drum mill. In further embodiments, the tube drum mill is equipped with a system for controlling and regulating heating temperatures.

In the mill, the suspension of PG and dilute chloride solution is mixed with hot flue gasses. The hot flue gasses effectively transfer heat by direct contact with the suspension spray. The flue gasses heat the suspension to a temperature of ranging from about 85° C. to about 150° C. In some embodiments, the suspension is heated to a temperature of about 125° C. The suspension is mixed in the mill at a temperature of about 85° C. to about 150° C. for about 30 min to about 6 h. The exact time the sludge is mixed for depends on a variety of factors including, but not limited to, the geometry, type of mill, heat exchange capacity of the mill, and milling efficiency. As the suspension is heated by the flue gasses, excess water is evaporated and the suspension is concentrated forming a sludge. In further embodiments, the suspension contained within the mill is evaporated to a form a sludge having a $CaCl_2$ concentration between about 10% to about 50% w/w and a density of about 1100 to about 1600 kg/m$^3$. The mill also contains grinding mill pebbles, which grind the sludge as it is mixed within the mill. As previously discussed, mechanical manipulation increases the efficiency of impurity removal from the gypsum crystal lattice.

When the flue gasses heat the suspension spray volatile acids, such as hydrofluoric and sulfuric acids, are also evaporated. The volatile acid vapor is partly condensed and is directed through an exhauster to a scrubber. Within the scrubber, the volatile acid vapor is purified. Purified gasses exit the scrubber into the environment, while the acid solution is poured into a neutralization pool, where they are neutralized by carbonate powders and cooled to ambient temperature. Calcium sulfates precipitate in the form of hydrates. Calcium sulfites in an acidic environment become soluble bisulfites and are air-oxidized into sulfates and thus also precipitate as a dihydrate. Calcium fluoride precipitates as insoluble fluorite mineral. Phosphoric acid remains poorly dissociated because of its high acidity. As indicated by the two-way arrows between the scrubber and neutralization pool in FIG. 2, cooled water is recycled between the neutralization pool and scrubber. After settling in the neutralization pool, cooled water moves into the scrubber, and after being saturated by volatile acids, returns to the neutralization pool to begin the cycle again.

In other embodiments, a flow mixing system is used and thus, a mill is not used. Instead, in these embodiments, the suspension is pumped at a high velocity through a mixer/heat exchanger. In some embodiments, the suspension is mechanically manipulated to break down the particle size prior to being pumped into the mixer/heat exchanger. These embodiments are suitable for when the reaction between the chloride solution and the contaminants occurs rapidly (i.e. with a reaction time of only a few minutes). A hot sludge is produced after this process, as in the embodiments employing a mill.

After mixing and concentrating, the hot sludge can be moved into pools to complete recrystallization into large crystals of alpha-hemihydrate. The sludge can be maintained in pools for about 2 to about 5 hours at about 85° C. to about 150° C. In some embodiments, the slurry is prevented from cooling. Recrystallization is accompanied by galvanic removal of metals with an electrode potential lower than hydrogen at a cathode, as previously described in relation to FIG. 1.

In some embodiments, the hot slurry is galvanically treated in order to precipitate a part of heavy metals with an electrode potential lower than hydrogen as a galvanic alloy on its way to the filter press or centrifuge. Optional galvanic processing prior to filtering can remove some impurities prior to removal of impurities by a molecular sieve. This can effectively reduce the load on the molecular sieve and increase the lifespan of the molecular sieve. Optionally, the sludge can be stirred to increase the productivity of the galvanic process as previously described in relation to FIG. 1.

After recrystallization, and in some embodiments galvanic processing, the sludge containing the alpha-hemihydrate is filtered, as previously described in relation to FIG. 1. Hot slurry on the filter-press (or centrifuge) is divided into a solution and hot dense residue (wet cake). After filtering, the wet cake is washed under pressure by water obtained from the neutralization pool at a temperature of about 90 to about 100° C. During washing, the chloride solution containing impurities is forced out of the inter-granular space of the alpha-hemihydrate crystals by the pressure of the wash water. The wash water is then mixed with the filtered solution.

In some embodiments, the wet cake is washed with pressurized hot fresh water of about 90° C. to about 100° C. from the oxidation pool and enters the hot mixer. Excess of powdered quicklime neutralizes the residual phosphoric and sulfuric acids in the wet cake resulting in a hot mass. In some embodiments, the hot mass is hot pressed to form gypsum building products. In other embodiments, the hot mass is dried to form gypsum binders.

After filtering, the hot, viscous mixture containing the alpha-hemihydrate and remaining wash water can be directed to a hot thermally insulated mixer. In the thermally insulated mixer, the hot viscous mixture is mixed with a calcium oxide (quick lime) powder. The calcium oxide powder is hydrated when mixed with the hot viscous mixture and generates heat and neutralizes the remaining acids, mainly phosphoric and sulfuric acids, within the hot viscous mixture. This transforms the remaining acids into insoluble compounds containing calcium phosphate salts. More particularly, the hot viscous mixture containing phosphoric acid from PG settles from suspended carbonate particles and is neutralized by carbonate powder to a pH of about 7. $P_2O_5$ is precipitated out of the solution during neutralization in the form of calcium phosphate. The calcium phosphate, in some embodiments, is returned to the production of phosphoric acid. Recycling of $P_2O_5$ in this fashion allows for the saving of $P_2O_5$ lost in PG stacks.

In some embodiments, silicon acid, preferably in a colloid solution, can be introduced into the neutralization mixture, where it reacts with the excess calcium oxide to add waterproofing to the gypsum product. In other embodiments, silicon acid can be introduced to the surface of the product to add water-proofing to the gypsum product. The gypsum product can be further dried into gypsum binder or can be directly molded into prefabricated products as previously described in relation to FIG. 1.

The liquid fraction produced after filtering and excess rinsing water (waste stream) is directed into an intermediate vessel, cooled down, and returned to the production cycle, provided that it has not accumulated an undesirable level of impurities, particularly radionuclides. As used in this context, undesirable level of impurities means that the level of impurities has reached a level that the waste stream is unsuitable to be recycled back into the production cycle. In some embodiments the waste stream is unsuitable when impurities reach a level that is set to accommodate client demands and/or government regulations. In other embodiments, the waste stream is unsuitable when impurities reach a level that no longer allows for purification of the PG by using the recycled waste stream.

If the waste stream has accumulated an undesirable level of impurities, then the waste stream is purified as previously described in relation to FIG. 1. For purification, in some embodiments, the solution is passed through a molecular sieve. In some embodiments, the molecular sieve is a zeolite, ionic exchange resin, an aluminosilicate mineral, a silica gel, and combinations thereof. For absorption of heavy and/or radioactive metals, in some embodiments, zeolite materials, such as mineral clinoptilolite or its synthetic analogue produced from tuff, are used. In some embodiments, zeolite materials with silica to aluminum ratios of at least 1:4 (mass/mass) up to about 1:1 (mass/mass) are used.

The purified solution is fed into an intermediate vessel and then replaces the contaminated solution in the technological cycle of PG purification. In some embodiments, prior to entering a molecular sieve, the waste stream is first treated using isothermal settling. During this process, the waste stream is settled while avoiding cooling of the waste stream.

In some embodiments the temperature of the waste stream is maintained at about 85 to about 125° C. This prevents absorption of the impurities on the surface of the fine fraction that is passed through the filter. After the waste stream is purified, it is returned to the PG production cycle. In some embodiments, the waste stream is galvanically processed prior to being passed through the molecular sieve.

In some embodiments, isothermal settling also includes precipitation of calcium phosphate from the remaining solution fraction. In these embodiments, calcium oxide and/or carbonate powder is added to the solution fraction to neutralize the solution and precipitate out the calcium phosphate. The precipitated calcium phosphate is then used in the production of phosphoric acid by a phosphoric acid plant. In some embodiments, the remaining waste stream is purified by passing through a molecular sieve and/or galvanic processing and returned to the PG production cycle.

In other embodiments, the waste stream is cooled to ambient temperature in an open pool. In these embodiments, the impurities are concentrated in the solid residue within the waste stream. In some cases the impurities within the solid residue constitutes approximately 2-3% w/w of the total mass of the residue. Ions of heavy and radioactive metals are adsorbed on the surface of the fine fractions. As such the solid residue appears dark gray to dark green in color. The remaining liquid fraction contains calcium phosphate. This remaining liquid fraction is neutralized in order to extract the calcium phosphate using the same method for extracting calcium phosphate previously discussed. Recovered calcium phosphate can be used by a phosphoric acid plant for the production of phosphoric acid. In some embodiments, the remaining waste stream is purified by passing through a molecular sieve and/or galvanic processing and returned to the PG production cycle.

As discussed, $P_2O_5$ can be recovered from steps in the disclosed process for purifying PG and recycled back to phosphoric acid plants. In some embodiments, substantially all of the P is recovered and returned to the phosphoric acid plant. In other embodiments, a portion of the P is recovered. The extent of recovery depends on a variety of factors, including but not limited to, the source of the PG and the ratio of phosphoric acid to PG. Recovery and recycling of the P from PG makes some embodiments environmentally friendly.

Figure 15:
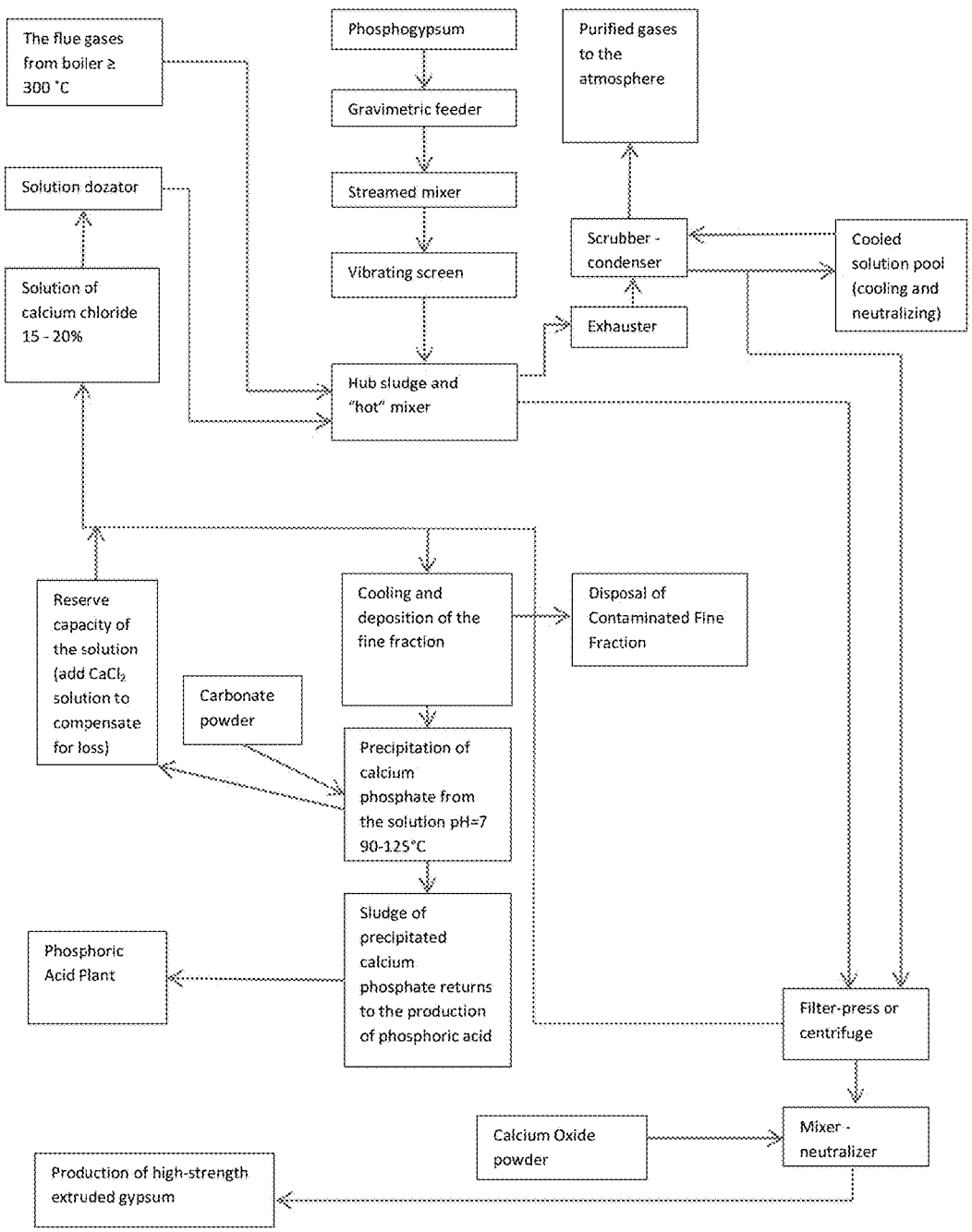
FIG. 15 shows a flow diagram demonstrating another embodiment of a method to purify PG.

FIG. 15 depicts other embodiments of the system for purifying PG. In some PG from a PG stack can be processed as described in relation to FIG. 2, and be deposited in a hub sludge/hot mixer. Hot flue gasses can be added to the hub sludge/hot mixer. A concentrated calcium solution can be added to the PG in the hub sludge/hot mixer. Like the embodiments in FIG. 2, exhaust from the hub sludge/hot mixer can be sent to an exhauster, scrubbed and condensed in a scrubber and/or condenser, which can purify the exhaust gasses for release into the atmosphere. The contaminants removed from the scrubber/condenser can be cooled and neutralized in cooling/neutralization pool fluidly coupled to the scrubber/condenser. In other embodiments, the contaminants removed from the scrubber/condenser can be filtered via a filter, such as a press filter or a centrifuge.

PG slurry from the hub sludge/hot mixer can be sent to a filter, such as a press filter or centrifuge. The solid fraction ("cake") portion can be sent to the mixer and can be optionally neutralized in the mixer by adding calcium oxide. The calcium oxide can be in a solution or in powder form. The neutralized PG can then be used to make high-strength extruded gypsum.

The liquid portion from the filter, which contains the fine PG fraction ("fine fraction") and calcium chloride can be recycled back to the system and be used again to react with additional raw PG as the process repeated if desired. If the contaminant level in the liquid portion is greater than desired, the solution can be purified. The solution can be cooled and the fine fraction can separated from the waste liquid flow. The fine fraction can then be disposed of. The purified waste flow can be reacted with carbonate powder and a calcium phosphate solution pH=about 7 at a temperature of about 90° C. to about 125° C. The sludge produced from the reaction of the purified waste flow and calcium phosphate can be returned to a phosphoric acid plant for the production of phosphoric acid. The liquid portion produced from the reaction of the purified waste flow and phosphoric acid/carbonate solution can be recycled back into the system by being added to the reserve capacity of the calcium chloride solution. The contaminated fine fraction can be disposed of.

In yet further embodiments, the PG from a phosphorus plant or stack can be reacted with the concentrated chloride solution in a reaction pool. In some embodiments, the reaction pool can be a pond. The pond can be a lined pond. In some of these embodiments, the reaction pool can be heated using solar heat/energy (e.g. sunlight) or a suitable artificial heat source. Suitable artificial heat sources are generally known to those in the art. In other embodiments, the reaction is carried out at the temperature of the environment. The reaction in the reaction pool can be conducted with or without mixing as described elsewhere herein. In some embodiments, mixing in the reaction pool is carried out using a slurry recirculation pump. Separation of the solid fraction can be conducted in the reaction pool by methods described elsewhere herein. In some embodiments, separation of the solid fractions (coarse and fine) and the liquid waste fraction can occur in the reaction pool via settling. In some embodiments, the solid fraction is removed from the top or a region near the top of the PG slurry. In other embodiments, portions of the reacted PG slurry can be selectively removed from the reacted PG slurry based on their position relative to the top of the reacted PG slurry to selectively concentrate, remove, or isolate different fractions such as the fine solid fraction, coarse solid fraction, or other phases present in the reacted PG slurry (e.g. binder phases or calcium sulfate hemihydrate). In other embodiments, the reacted PG slurry, solid fraction, or liquid waste fraction can be removed from the reaction pool and transferred into the reaction pool of FIG. 2 for further processing or the filter-press or centrifuge of FIG. 2 or 15.

During dehydration and/or reaction of the PG with the concentrated chloride solution, hemi-hydrate crystals and other crystals (e.g. dihydrate crystals) can form. During their formation (during the reaction with the chloride solution or during dehydration) the crystals can be fractionated from the PG sludge. The crystals can be fractionated based on their crystal size, type, and/or morphology by a suitable method. Suitable methods include, but are not limited to, slow upward flow and bubbling of air or other gasses. Other suitable fractionation methods will be appreciated by those of skill in the art. In some embodiments, fractionation can be performed during the last half of the reaction step. In other embodiments, fractionation can be performed near the end of the reaction step.

In some embodiments, the PG is already present in the reaction pool prior to reacting the PG with the concentrated chloride solution. For example, the PG may be disposed of in a reaction pool upon its synthesis by a phosphoric acid plant. In other embodiments, the PG is transported to the reaction pool. The PG can be transported as a PG slurry. PG slurries are described elsewhere herein and generally can be made by adding brine or salt water to the PG. Additional compounds can be added to the PG slurry during transportation to the reaction pool. Such compounds are described elsewhere herein. Once in the reaction pool, the PG slurry can be evaporated. During evaporation compounds contained in the PG slurry can become concentrated as compared to their respective concentration in the PG slurry prior to evaporation. For example, chloride salts present in the PG slurry can become concentrated after evaporation. In embodiments, where the PG slurry is made with a brine containing calcium sulfate, during evaporation the PG slurry can become saturated with calcium sulfate and any excess calcium sulfate can precipitate in the reaction pool. The precipitated calcium sulfate can be recovered and recycled back into the system or used for other purposes generally known. Evaporation can occur via solar energy/heat or by a suitable artificial heat source generally known in the art.

Figure 14:
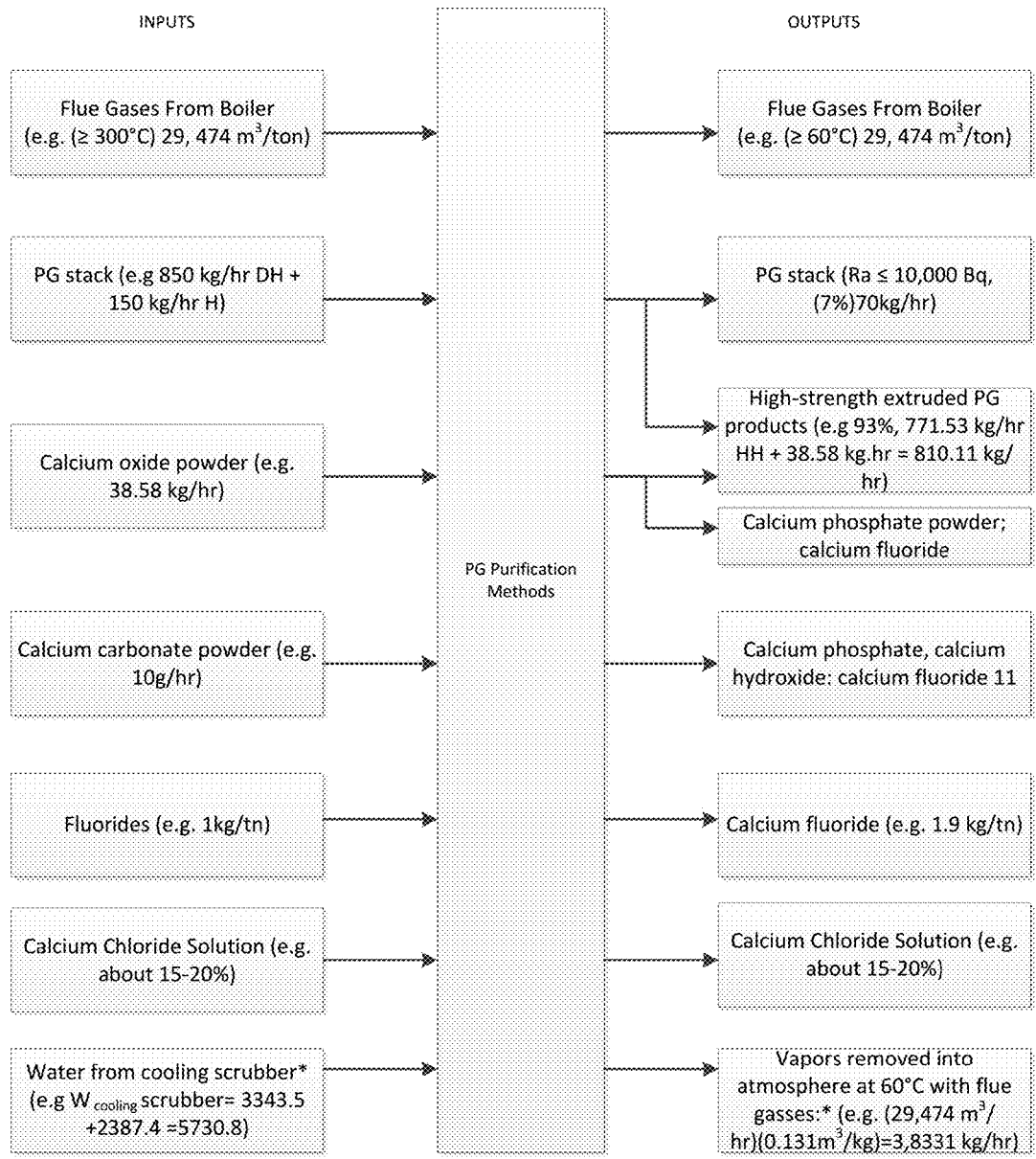

FIG. 14 summarizes the inputs and outputs of the methods described in relation to FIG. 1 and the systems of FIGS. 2 and 15. FIG. 14 also provides examples as they can be present on an industrial scale.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Solubility of Contaminants in PG when Complexed with Sulfate or Chloride Introduction Ra and other contaminants found in PG, such as sulfate and phosphate salts, are poorly soluble in an aqueous medium, and thus, are difficult to remove. However, when these contaminants are complexed with chloride, their solubility can be dramatically increased.

As shown in FIG. 3, which is a table showing solubility of various elements when complexed with sulfate or chloride, complexing impurities with chloride increases their solubility. In general, the greater the concentration of chloride anion in the solution; the better the extraction efficiency, particularly for Ra.

Materials and Methods

The first series of tests was made to study purification of PG, which began by reaction of PG with a solution of calcium chloride at an elevated temperature (about 90° C.±2.5 degrees Celsius) in combination with intense mechanical agitation of the resulting slurry. In this context, intense mechanical agitation describes agitation that increases the temperature of the slurry. The water-to-solids weight ratio of the calcium chloride solution was about 2.2. Reaction time, slurry pH, and $CaCl_2$ concentration were varied to gauge the effect of these parameters on process efficacy. Reaction time was varied from about 5 minutes to about 48 hours, $CaCl_2$ concentrations ranging from 0 to about 40%, slurry pH in most of the samples was accepted natural (acidic), while its accurate value depended on the chloride concentration and varied from about −1.6 to 2.2. Some samples were buffered with $Ca(OH)_2$; pH in these slurries was neutral (about 7.7 to about 8.0), The time at which PG was added to the pre-heated calcium chloride solution was considered as time zero. $^{226}Ra$ activity was measured using a high-purity germanium detector.

Results

Figure 4A:
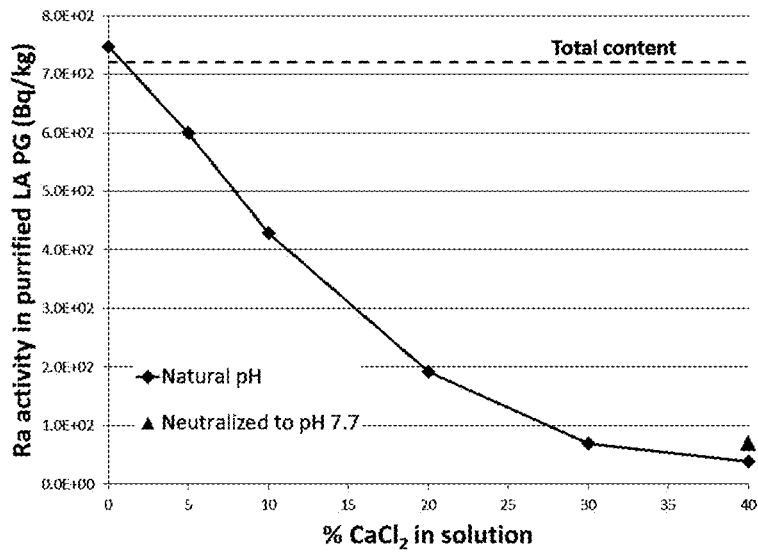
FIGS. 4A and 4B are graphs showing radium activity in PG processed according to the methods and systems described herein in two different locations.
Figure 4B:
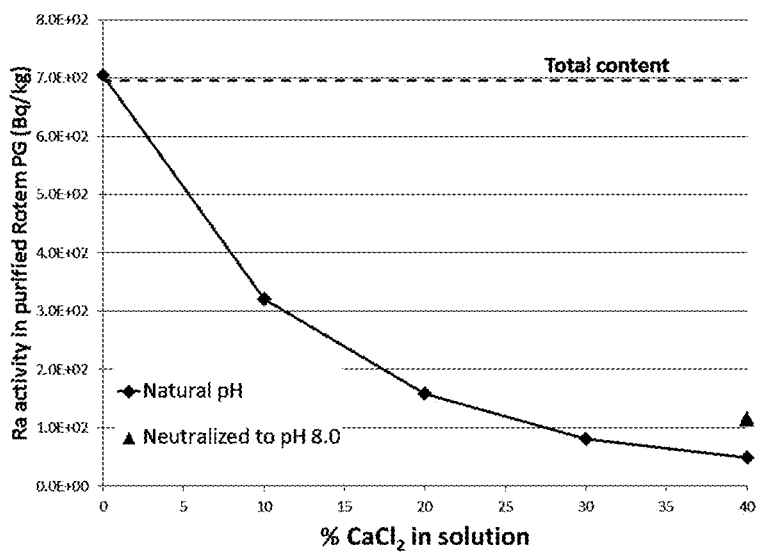

As shown in FIGS. 4A and 4B, which are graphs showing radium activity in PG purified according to the methods and systems described herein in two different locations: FIG. 4A: Louisiana, United States, and FIG. 4B: Rotem, Israel. The figures demonstrate that as the concentration of the $CaCl_2$ solution increased, removal of $^{226}Ra$ increased. The experiments performed in the laboratory demonstrated that purification of PG of two sources, Louisiana, U.S. and Rotem, Israel from radium in concentrated chloride solutions is feasible. Ra activity is comparable for LA PG (720 Bq/kg) and Rotem PG (700 Bq/kg).

$^{226}Ra$ activity is reduced about 50% when the concentration of the $CaCl_2$ solution is greater than about 10%. The target value of the purification process was chosen as about 100 Bq/kg, which corresponds to the level of radium equivalent activity observed in ordinary Portland cements. This target value was achieved in the solutions with chloride concentrations of about 30% and greater. In both cases, at $CaCl_2$ concentrations of greater than about 10% and greater than about 30% the partial dehydration of calcium sulfate dihydrate was observed. Full dehydration occurs at greater temperatures, about 125 to about 130° C. at about 40% calcium chloride concentration.

As such, a temperature range of about 125 to about 130° C. is recommended for the production of valuable construction products: gypsum binders based on hemihydrate and/or finished building products. The combination of intense agitation and heating of PG up to the dehydration temperatures in concentrated chloride solution can be considered as the most effective method of purification from radioactive contaminants. At dehydration, the radium and heavy metals move into the solution, attacked by chloride ions, and after formation of the new hemihydrate crystals are easily washed out.

Example 2: Effect of Extended Mixing at Room Temperatures on Purification of $^{226}Ra$ from Phosphogypsum in a High Concentration Chlorine Solution Introduction As far as the gypsum purification only is concerned, excluding the stages of the manufacture of valuable products (gypsum binders or finished building products), heating, and heavy agitation are not required. Removal of $^{226}Ra$ into chloride solution even under relatively low temperatures under extended exposure of PG to a concentrated chloride solution. This reaction can be conducted with optional moderate agitation. As used in this context, "extended mixing" refers to the minimum amount of time that is sufficient for a majority of the impurities to move into solution when the gypsum crystal dissolves. As used in this context, moderate agitation describes a moderate agitation process that is sufficient to keep the slurry in suspension. Moderate agitation typically does not influence the temperature of the slurry because of the low friction occurring between agitating parts of mixing equipment and solid fraction of the suspension.

Materials and Methods

Rotem PG was treated in a 20% calcium chloride solution for 48 hours at room temperature (approximately 25 degrees Celsius) with continuous mixing. The slurry in these tests was significantly diluted, with water to solid ratio of 10:1.

Louisiana PG was treated in a calcium chloride solution of about 40% for 7 days at about 35° C., and was continuously mixed by end-over-end tumbling. The water to solid ratio was 1:1.

Results

For Rotem PG, $^{226}$Ra activity was reduced to ~180 Bq/kg, which was similar to the results achieved under heating to 90° C. (FIGS. 4A and 4B). The positive results of purification can be explained by the extended mixing the diluted slurry. During extended mixing at room temperature gypsum crystals dissolve and radium and other contaminants move into the solution. Once in solution, radium and other contaminants are attacked by chloride ions. Under such a low temperature, dihydrate is recrystallized, which can be washed out easily. This method can be implemented for the production of purified gypsum and gypsum binder, but the questions of handling a large amount of chloride solution containing different contaminants are left unanswered. For Louisiana PG, $^{226}$Ra activity was reduced to ~210 Bq/kg, and the formation of dehydrated gypsum phases was observed by SEM.

Example 3: Temperature Dependent Increase in Removal of $^{226}$Ra from Phosphogypsum and Effect of Agitation Speed Introduction All things being equal, a shorter process time is more economical. As such, the effect of temperature on $^{226}$Ra removal during a chloride solution reaction time of 30 minutes was examined.

Materials and Methods

This series of tests was conducted with PG slurries of high viscosities, prepared at water to solid ratio of 0.6:1, at an acidic pH (pH less than about 3). The concentration of calcium chloride was about 40% in all the tests. The $^{226}$Ra activity concentrations were measured by scintillation NaI (Tl) spectrometer on the filtered and oven-dried samples of phosphogypsum in its dihydrate form.

Results

The results are shown in Table 1.

TABLE 1

| Reaction (processing) conditions | | | |
|---|---|---|---|
| Suspension temperature, T, ° C. | Duration of mixing, t, min | Rotation speed, N, rpm | $^{226}$Ra activity concentration of the filtered product (dihydrate), Bk/kg |
| 28 | 30 | 120 | 581.0 ± 29.9 |
| 28-93* | 30 | 14000 | 115.9 ± 7.1 |
| 120-125 | 30 | 14000 | 93.0 ± 6.1 |

Figure 5:
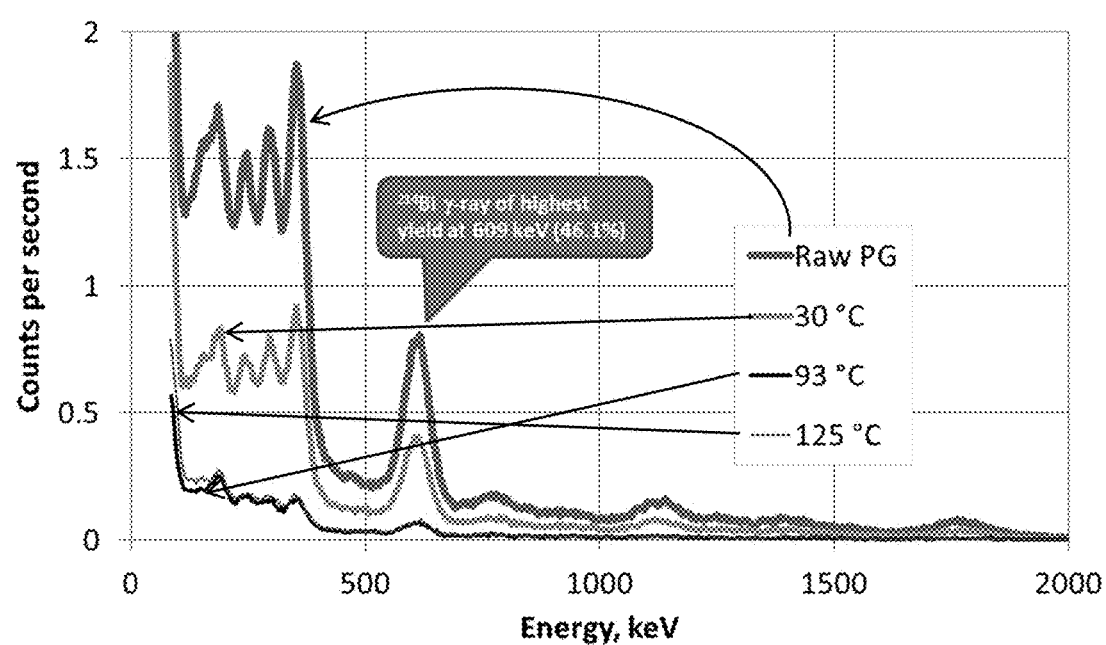
FIG. 5 is a graph depicting the gamma ray spectra of PG samples obtained by processing of PG from Rotem, Israel according to the methods and systems described herein. Specifically.

*The slurry was heated up gradually because of the friction between the mixer knives and the solid particles As shown in FIG. 5, which is a graph depicting the gamma ray spectra of PG samples obtained processing of PG according to the methods and systems described herein in Rotem, Israel, removal of $^{226}$Ra is temperature dependent, with an increase in $^{226}$Ra removal correlating to an increase in temperature. An increase in $^{226}$Ra removal was observed between CaCl$_2$ treatment at 30 degrees Celsius and CaCl$_2$ treatment at 93 degrees Celsius. There was almost no further increase in $^{226}$Ra removal observed between CaCl$_2$ treatment at 93° C. and CaCl$_2$ treatment at 125° C.

In short, $^{226}$Ra activity concentration in PG samples decreased significantly as a result of relatively short (30 min) and intensive mechanical agitation. The internal friction of the suspension raised the reaction temperature up from room temperature to 93° C. At this temperature, gypsum dehydration started and gypsum crystals disintegrated. While not wishing to being bound to any theory, it is believed that the increase in temperature in combination with the mechanical agitation accelerated dehydration of gypsum crystals, made removal of radium salts from gypsum crystal lattice and into the chloride solution easier, and accelerated formation of hemihydrate crystals. It is noted that a further increase in temperature, for example to 125° C., did not result in a further significant decrease in $^{226}$Ra activity.

As shown in Table 1, which is a table showing $^{226}$Ra activity in PG samples processed in Rotem, Israel, before and after treatments in a concentrated CaCl$_2$ solution, $^{226}$Ra activity decreased in a temperature dependent fashion. It is noted that a further increase in temperature, for example to 125 degrees Celsius, did not result in a further significant decrease in $^{226}$Ra activity.

Example 4: Effect of Agitation Speed on Removal of $^{226}$Ra from Phosphogypsum From the previous example it can be seen that the effect of temperature is important. To assess the influence of the agitation speed only at the same temperatures favorable for the removal of $^{226}$Ra from phosphogypsum, the following series of tests with the same type of PG slurries of highly viscous consistency, prepared at water to solid ratio of 0.6:1 and concentration of calcium chloride of 40% in the solution at an acidic pH (pH<about 3) conducted. The rotation speed was varied in two levels, 120 and 14000 rpm. The results are given in Table 2.

TABLE 2

| Reaction (processing) conditions | | | |
|---|---|---|---|
| Suspension temperature, T, ° C. | Duration of mixing, t, min | Rotation speed, N, rpm | $^{226}$Ra activity concentration of the filtered product (dihydrate), Bk/kg |
| 120-125 | 30 | 14000 | 93.0 ± 6.1 |
| 120-125 | 30 | 120 | 164.4 ± 9.3 |

It can be seen that the high agitation speed at the same processing temperature approximately doubled the $^{226}$Ra removal efficiency.

Example 5: Effect of Reaction Time with Calcium Chloride Solution on the Removal of $^{226}$Ra from Phosphogypsum An additional parameter, which can influence the process efficiency, is time of the reaction. This factor was evaluated in the series of tests with the same type of phosphogypsum slurries. The results are shown in Table 3.

TABLE 3

| Reaction (processing) conditions | | | |
|---|---|---|---|
| Suspension temperature, T, °C. | Duration of mixing, t, min | Rotation speed, N, rpm | $^{226}$Ra activity concentration of the filtered product (dihydrate), Bk/kg |
| 120-125 | 30 | 14000 | 93.0 ± 6.1 |
| 120-125 | 15 | 14000 | 115.6 ± 7.4 |
| 120-125 | 8 | 14000 | 169.8 ± 10.1 |

It can be observed that the targeted level of the final $^{226}$Ra activity concentration in given phosphogypsum samples (around 100 Bq/kg) can be achieved at mixing duration longer than 15 minutes.

Example 6: Effect of PG Preparation on PG Purification According to Methods Described Herein on 226Ra Activity Concentration PG byproduct exists in the industry as "Wet" or "Dry." It is known by those of skill in the art that PG agglomerates into a dense cake without additional intervention. "Dry" PG has the same moisture content as when it was discharged from the source (e.g. phosphoric acid plant) that produced it. In other words, dry PG is the agglomerated cake PG byproduct after discharge from the PG source. "Wet" PG refers to the PG formed after water has been added to the dry PG to form a slurry after its discharge from the source of PG (e.g. phosphoric acid plant). For Examples 7-13, one dry preparation and 2 wet preparations of PG were evaluated.

The dry PG was obtained from the Rotem plant (Israel). Please confirm or correct. To produce the wet PG preparations, PG samples from the Rotem plant and from a disposal site of Haifa fertilizers was immersed in water at about room temperature room for about 1 day with mild mixing using a paddle at about 60 rpm for about 1 hour during the day. After the first day of water immersion and paddle mixing, the PG was re-immersed in water for about 1 more day. The re-immersed PG was again subjected to mild mixing using a paddle at about 60 rpm for about 1 hour. $^{226}$Ra activity was measured prior to further processing.

The resulting slurries in each case were dried overnight at about 50° C. After drying, the dried PG slurries were sieved through an about a 1 mm sieve to remove large particles from the dried PG slurries. After course filtering, the dried slurries were further filtered through a 0.075 mm sieve in small portions to estimate the content of fine particles passing through the 0.075 mm sieve. The residue on the 0.075 mm sieve was about 51.47%

The filtered and dried slurries were then subjected to purification methods described elsewhere herein. Briefly, they were reacted with a 40% (w/w) CaCl$_2$ solution at about 120° C. for about 40 minutes. The PG/CaCl$_2$ slurry was then filtered under a pressure of about 3 atm and washed at about 100° C. The filtered and washed product was then neutralized with lime at a temperature of not less than about 80° C. The temperature of the wet molding powder was not less than 80° C. and the pressure at pressing of the wet molding powder was not lower than 20 MPa. Wet molding powder as used herein refers to a semi-dry powder (or slurry or filtrate) obtained after filtration of the slurry.

After purification of the PG of different origins, the $^{226}$Ra activity was measured. Table 4 shows the radioactivity of PG of different origins before and after purification. It was observed that the initial $^{226}$Ra activity concentration were similar in all PG tested (about 0.7 Bq/g). Despite the difference in the degree of aggregation of the PG (wet v. dry) and crystallization conditions of calcium sulfate dihydrate in these three types of PG sources, the extraction of radium ions in the process of recrystallization of dihydrate into hemihydrate occurred well in all samples. As a result $^{226}$Ra activity concentrations were decreased by about 20 times after purification of PG by methods described herein.

TABLE 4

| Type of PG source | Initial $^{226}$Ra activity concentration, Bq/kg | $^{226}$Ra activity concentrations after purification, Bq/kg |
|---|---|---|
| Dry "ROTEM" | 664.9 ± 34.0 | 42.3 ± 5.6; 23.0 ± 4.8; 37.4 ± 4.3 |
| Wet "ROTEM" | 686.7 ± 35.1 | 27.8 ± 1.8; 36.4 ± 5.1 |
| Wet "Haifa Fertilizers" | 710.0 ± 36.3 | 34.7 ± 4.1; 47.5 ± 5.8; 37.2 ± 4.3 |

Example 7: Effect of CaCl$_2$ Concentration and Water to Solid Ratio on PG Purification Dry Rotem PG was used as the starting material to determine the effect of CaCl$_2$ concentration and water to solid ration on PG purification. About 150 g of PG was mixed with varying volumes of CaCl$_2$ solutions of varying concentrations. The concentration of CaCl$_2$ varied from 0 to 60% CaCl$_2$ (w/w) at a L/S ratio of 1 (circles in FIG. 6) or 3 (triangles in FIG. 6). The reactions were carried out at about 90° C. for about 0.5 h. The reaction suspensions were stirred at a moderate speed (about 120 rpm) to mix the suspension. After reaction with CaCl$_2$, the resulting wet cakes were filtered and doubled washed with boiling water. Filtering was conducted under pressure of about 3 bar.

Figure 6:
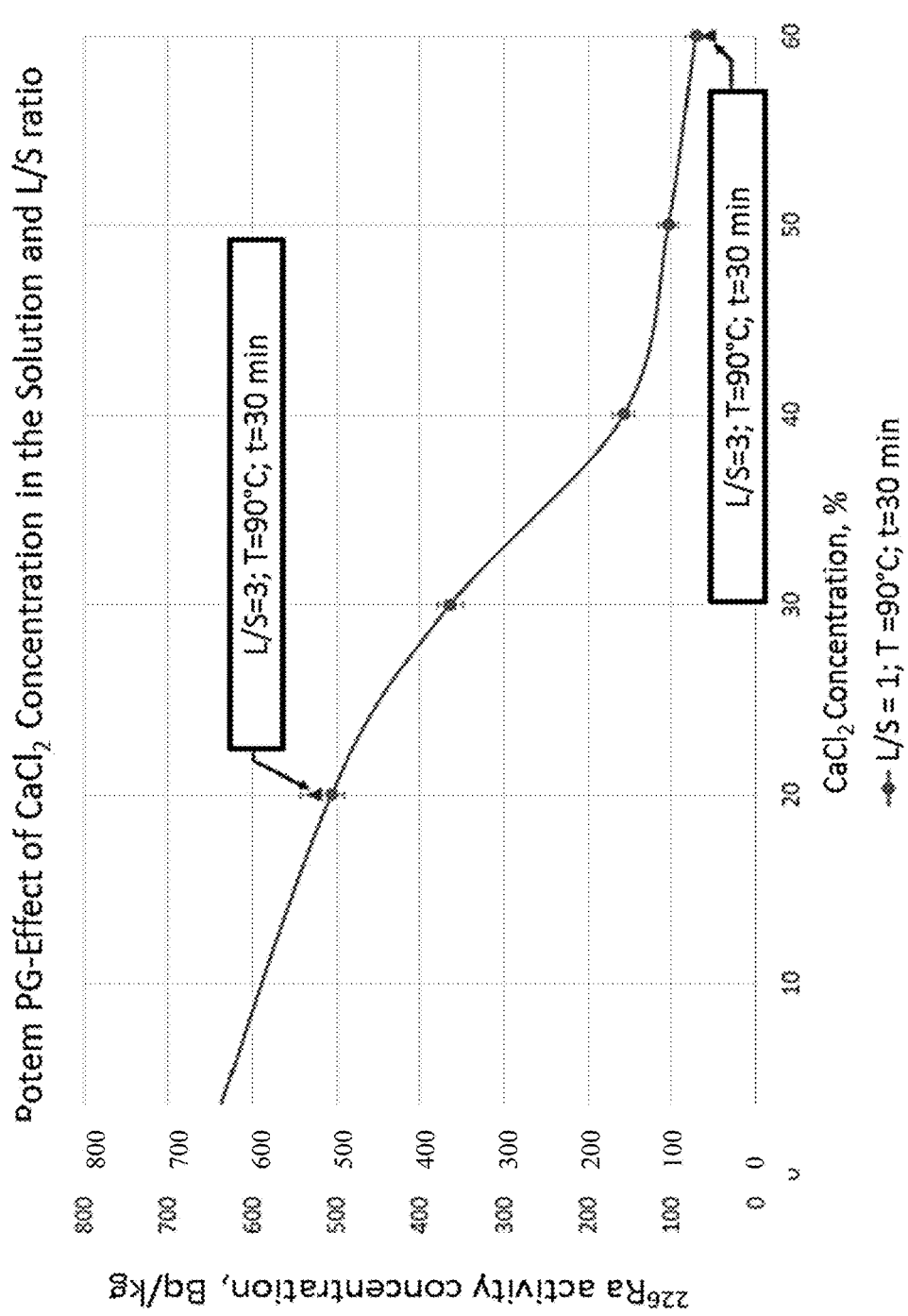
FIG. 6 shows a graph demonstrating the effect of $CaCl_2$ concentration in the solution in phosphogypsum suspensions made at different liquid to solid rations (L/S). The reaction temperature was about 90° C. and the reaction time was about 0.5 hours.
Figure 7:
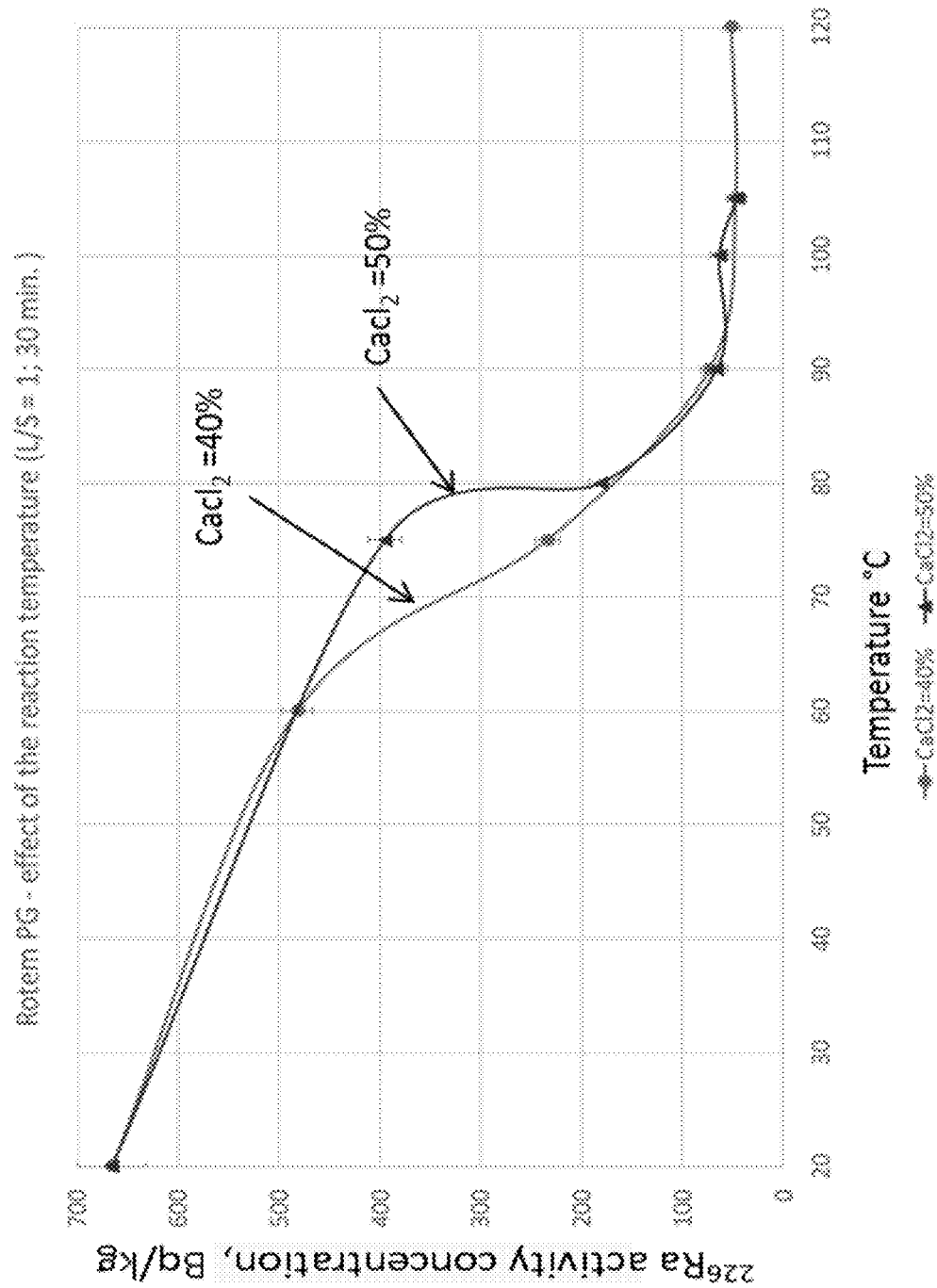
FIG. 7 shows a graph demonstrating the effect of $CaCl_2$ solution temperature on PG purification. (L/S ratio=1, 40% or 50% $CaCl_2$ (w/w), 30 min reaction time).
Figures 8A, 8B:
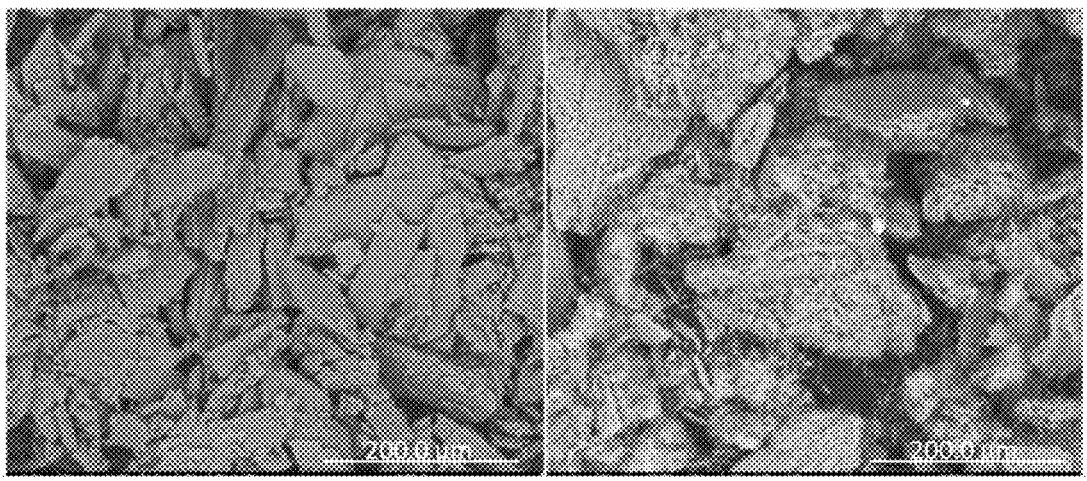
FIGS. 8A and 8B show scanning electron microscopy (SEM) photomicrographs of untreated (FIG. 8A) and treated (FIG. 8B) in 40% (w/w) $CaCl_2$ solution at 90° C. and L/S=1 PG under 500× magnification.
Figures 9A, 9B:
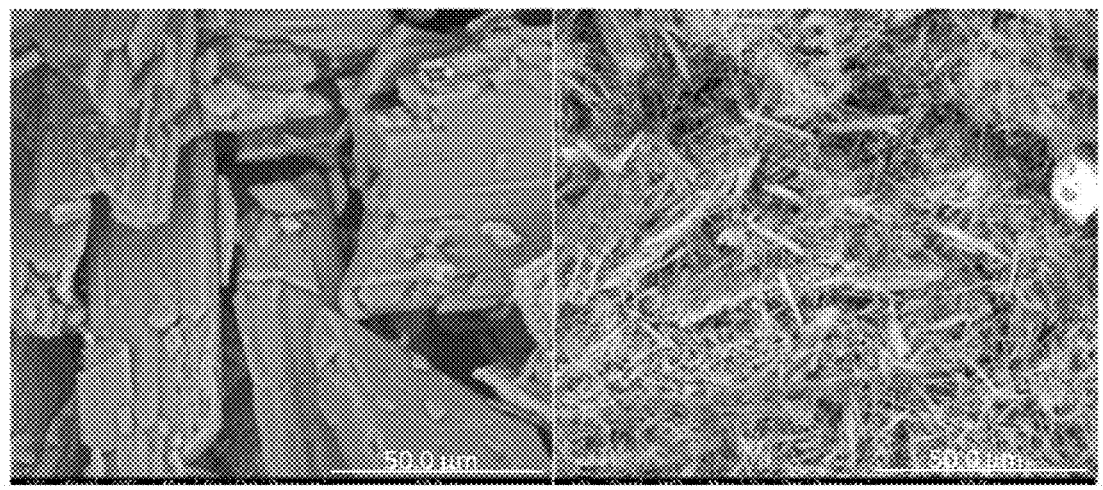
FIGS. 9A and 9B show SEM photomicrographs of untreated (FIG. 9A) and treated (FIG. 9B) in 40% (w/w) $CaCl_2$ solution at 90° C. and L/S=1 PG under 2,000× magnification.

The results are demonstrated in FIG. 6. The error bars represent the measurement uncertainty at a confidence level of 95%. The results demonstrate that purification in chloride solutions with about a 40% or greater concentration were almost equally effective under these conditions. This takes into account that the more concentrated the solution, the more viscous the reaction mixture. In other words, the greater the concentration of the CaCl$_2$, the more difficult it is to mechanically manipulate the reaction mixture under these conditions and the greater the load on the mixer. However, sufficient purification can be obtained with a CaCl$_2$ concentration of about 40% (w/w).

The results demonstrated in FIG. 6 suggest that the effect of the L/S ration on the purification of PG under these conditions is minor, if any. For example, reacting PG with fixed concentrations of CaCl$_2$ (w/w) and a L/S ratio of 1 or 3 had similar $^{226}$Ra activity concentration. This was observed when the reaction was carried out at 90° C. (FIG. 6) or 120° C. (data not shown).

Example 8: Effect of CaCl$_2$ Reaction Temperature on PG Purification

Dry Rotem PG was used to determine the effect of CaCl$_2$ reaction temperature on PG purification. PG slurries were prepared with a 40% or 50% (w/w) CaCl$_2$ solution at a L/S ratio of about 1. The slurries were reacted with moderate mixing as previously described at varying temperatures (about 20° C. to about 120° C.). After filtering and washing as previously described in Example 7, $^{226}$Ra activity concentration was measured.

The results are demonstrated in FIGS. 7 through 9B. As demonstrated in FIG. 7, most effective purification with respect to $^{226}$Ra was achieved at temperatures greater than about 90° C. (about 90° C.–120° C.). This was the same for both concentrations of $CaCl_2$. While not being bound by theory, it is thought that at the greater temperatures, a large part of the dihydrate crystals disintegrate and the newly formed needle crystals that are characteristic of calcium sulfate hemihydrate take their place. This is supported by the SEM microphotographs shown in FIGS. 8A-9B. While a reaction temperature of about 90° C. produced sufficient PG purification, a temperature of about 120° C., which is near the complete phase transition from dihydrate to hemihydrate can produce the greatest PG purification was preferred. Please confirm or correct.

Example 9: Effect of $CaCl_2$ Reaction Time on PG Purification

Dry Rotem PG was used as the starting material to determine the effect of $CaCl_2$ reaction time on PG purification. Dry Rotem PG was reacted with a 40% (w/w) $CaCl_2$ solution with mixing for varying times of up to 120 minutes at 90° C. and a L/S ratio of about 1. After the reaction was complete, the PG slurries were filtered and washed as previously described in Example 7.

The results are demonstrated in FIGS. 10A-13. The SEM photomicrographs shown in FIGS. 10A-10D demonstrate insignificant changes in the type and dimension of the crystal lattice work of the purified PG. Some impurities were observed, such as potassium bromide, which are observed as light particles in the central part of FIG. 10B or alumosilicate, which are observed as large flat particles in the right side of FIG. 10C. These impurities were not observed to significantly influence the PG purification process as described herein.

Table 5 demonstrates the elementary composition of the PG samples treated for various times as compared with the elementary composition of untreated PG and the theoretical composition of dihydrate, hemihydrate, and anhydrite, which supports the observation that the impurities did not significantly influence the PG purification process. Further, the results in Table 5 support the observation that the most significant changes to the PG occurs within the first few minutes of the reaction.

TABLE 5

| Sample | Element, atomic %% | | |
|---|---|---|---|
| (reaction time in minutes) | O | S | Ca |
| 0 (untreated) | 73.4 | 12.7 | 13.9 |
| 15 | 65.0 | 16.9 | 18.2 |
| 30 | 69.9 | 14.4 | 15.7 |
| 60 | 63.4 | 17.8 | 18.8 |
| 120 | 67.3 | 15.5 | 17.2 |
| $CaSO_6$ (dihydrate) | 75.0 | 12.5 | 12.5 |
| $CaSO_{4.5}$ (hemihydrate) | 69.2 | 15.4 | 15.4 |
| $CaSO_4$ (anhydrite) | 66.7 | 16.7 | 16.7 |

Figure 11:
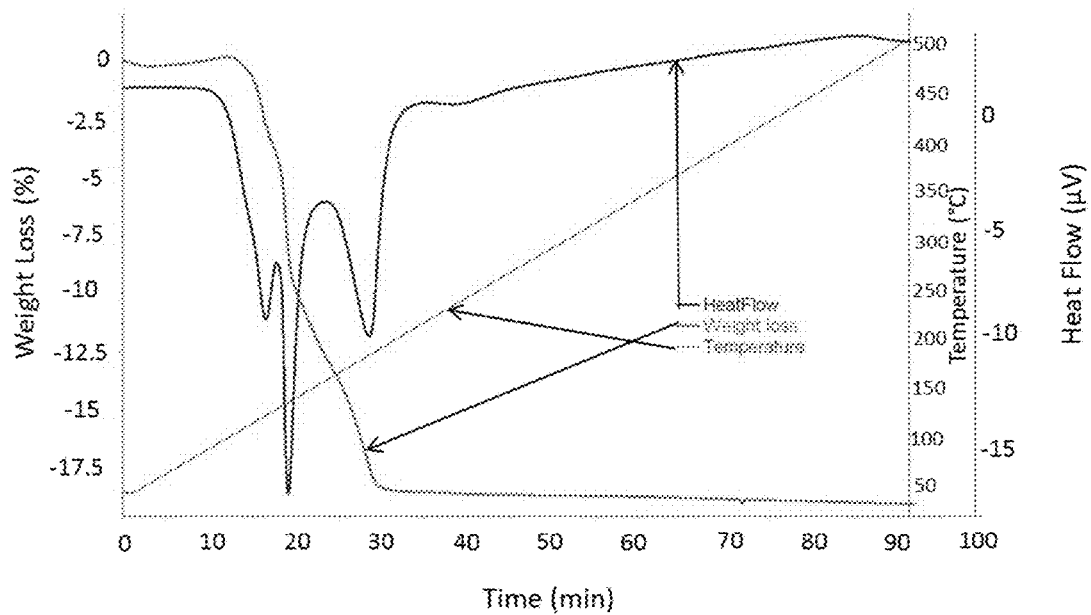
FIG. 11 shows a graph demonstrating TGS-DTA diagrams of the raw PG.
Figure 12:
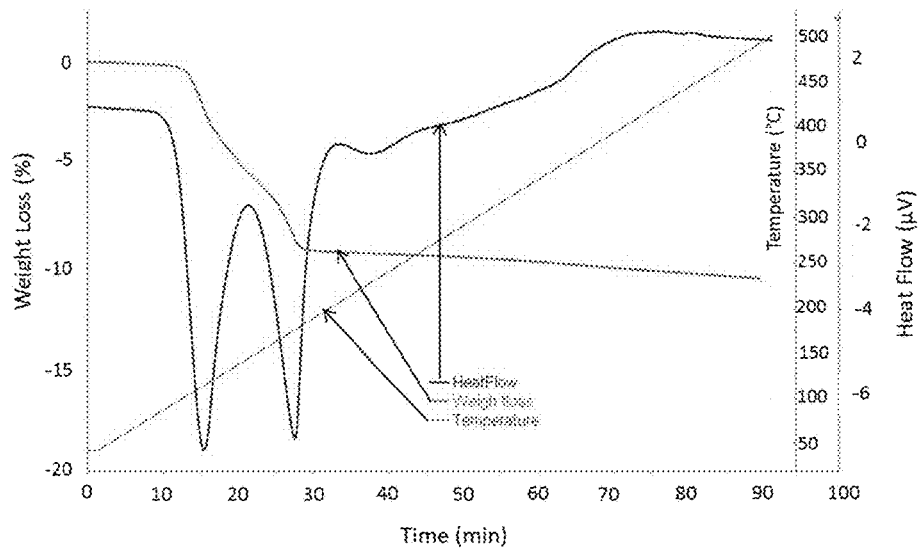
FIG. 12 shows a graph demonstrating TGS-DTA diagrams of PG treated for about 30 minutes in a 40% $CaCl_2$ solution at about 90° C. at a L/S ratio of about 1.
Figure 13:
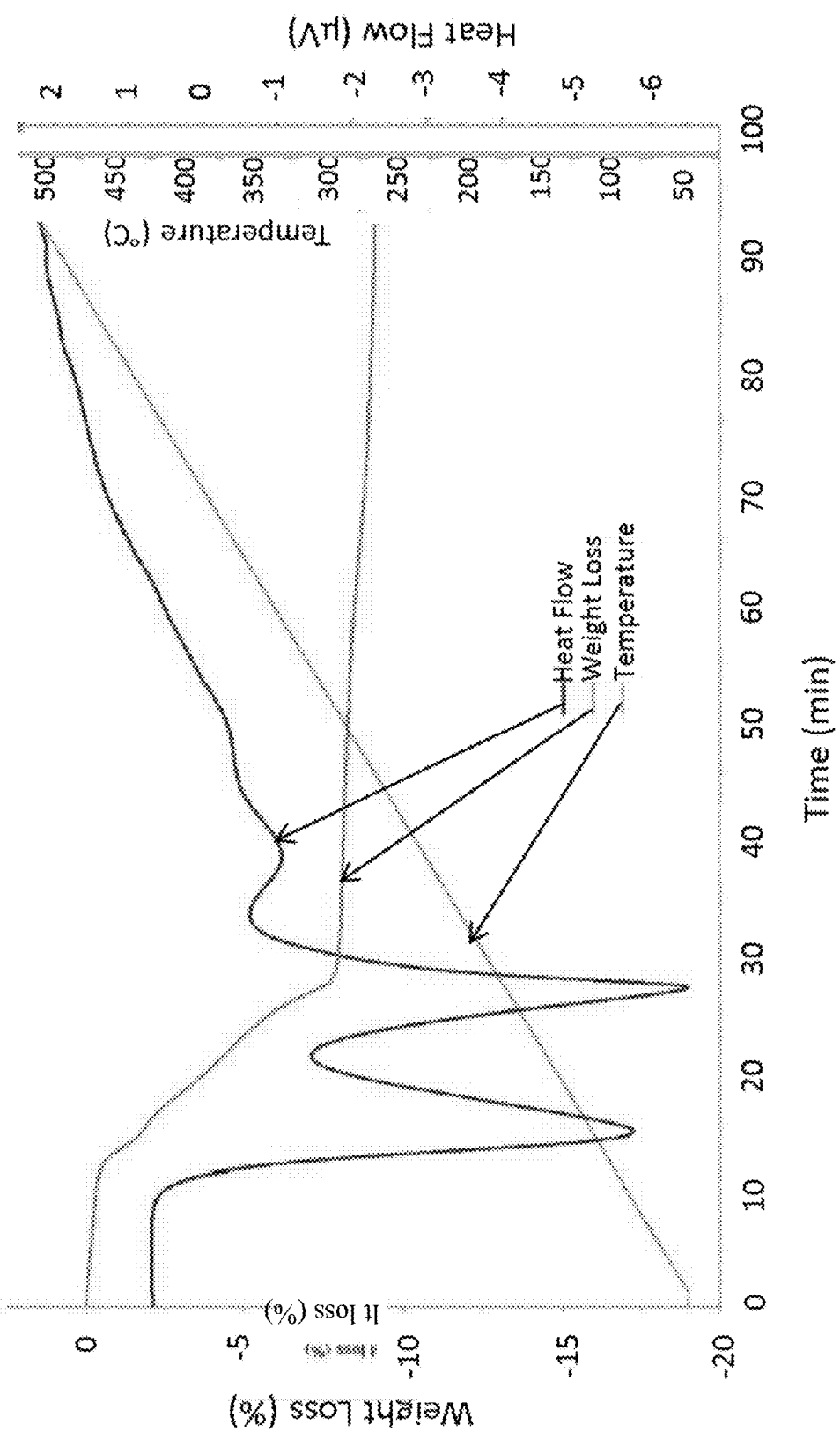
FIG. 13 shows a graph demonstrating TGS-DTA diagrams of PG treated for about 120 minutes in a 40% $CaCl_2$ solution at about 90° C. at a L/S ratio of about 1.

As demonstrated in FIG. 11, which demonstrates the TGS-DTA diagrams of the raw PG, the small endothermal peak starting at about 100° C. demonstrates the deliberation of free water. This suggests that the sample had some residual moisture and was not completely dried before the test. The largest endothermal peak was characteristic of dihydrate decomposition occurring at about 140° C., while the next (smaller peak) was characteristic of hemihydrate decomposition and formation of anhydrite at about 200° C. A small increase of the content of hemihydrate was observed when comparing between the TGS-DTA diagrams of the samples reacted for about 30 and about 120 minutes, which are demonstrated in FIGS. 12 and 13, respectively. A slight reduction of the first peach characteristic of dihydrate decomposition and an enlarging of the second peak characteristic of hemihydrate composition was observed. These changes were observed to be accompanied by a slight increase in the cumulative weight loss for longer treatment (FIG. 13).

Therefore, the TGS-DTA method was observed to be slightly more sensitive to the dehydration of PG as compared with elementary analysis using SEM EDS. These findings were consistent with previous findings described herein. The reaction of PG with hot calcium chloride solution was observed to be fast, with most of the microstructural changes occurring within the first few minutes of the reaction and little further reaction occurring with increased reaction times. These results suggest that 30 minutes is sufficient for PG purification as described herein.

Example 10: Effect of Mechanical Manipulation of the $CaCl_2$ Reaction Mixture on PG Purification The entire volume of the slurry containing the raw PG and concentrated calcium chloride solution can be thoroughly stirred and mixed during the reaction. This stirring and mixing can improve the purification of the PG. While not intending to be bound by theory, removal of $^{226}$Ra and other contaminants from PG can be improved via thorough stirring and mixing during the reaction with $CaCl_2$ due to the influence of the mechanical agitation on the phase changes of the PG. It is thought that mechanical agitation increases the amount of and/or the rate of dihydrate decomposition by increasing the surface area of the new hemihydrate (solid phase) and thus increasing the contact area with the surrounding reaction solution. This is supported by an decrease in the purification of PG when mechanical manipulation was not used during the reaction step.

Example 11: Filtering Slurry Suspensions and Washing the Filtered Solid Fraction ("Cake")

To examine the effects of various filtering and washing techniques, various amounts (about 150 g to exceeding 400 g) of reacted slurry was filtered through air filters that were heated by steam from the bottom portion of the air filter and hot compressed air coming from the top of the air filter. After reacting with the hot calcium chloride solution, the slurry was diluted with boiling water. The dilution of the slurry after the reaction with the hot calcium chloride solution can make the removal of the slurry from the isothermal mixer easier and complete. Dilution of the reacted slurry can also help achieve a uniform distribution over the filter surface. After depositing the reacted and diluted slurry on the surface of the filter, the slurry was filtered through the air filters described above. Filtering was conducted under a pressure of 3 bar for about 3-5 sec.

After compressed air replaced the diluted slurry in the filter, the filter was opened, boiling water was added to the initial volume of the slurry without disruption of the filter cake, and the filtration process was repeated. This resulted in a cake thickness of about 5-7 mm, which indicated an adequate washing after the first filtration. It was observed that for samples with a mass exceeding 400 g of PG, the quality of the sample washing was insufficient, even after 3 cycles of dilution with boiling water and filtering. While not being bound to theory, it is thought that samples with a mass exceeding 400 g of PG generated a layer of filtered material that was too thick, which generated ducts of washing water while islets of unwashed material are still left in the slurry.

Immediately after washing, the purified hemihydrate slurry was cast as 25 and 50-mm cubes. In case of insufficient washing of the precipitate hemihydrate, the cast gypsum cubes had a yellowish color and the strength was about 25% less than that of the samples obtained from the same batch, but fresh-washed to taste. At the same time, the difference in radioactivity of gypsum produced from well-washed and insufficiently washed slurries was within the instrument's uncertainty. While not being bound to theory, this may be explained by the fact that even the smallest amount of phosphate anion in acidic medium can prevent setting and hardening of gypsum plaster. It was observed that the water to binder (water to hemihydrate) ratio (WB ratio) in the filter cake, which is a main factor influencing the strength of gypsum depended on filtering conditions. This is discussed in greater detail in Example 12.

This process was performed in parallel but instead of diluting the slurry with boiling water, the slurry was diluted with room temperature water. This reduced the average temperature of the slurry from about 120° C. to about 100° C. While the amount of $^{226}$Ra was reduced as compared to the raw PG, there was still residual $^{226}$Ra activity of up to about 200 Bq/kg. This was significantly more residual $^{226}$Ra activity from slurry diluted with boiling water. While not being bound to theory, it is thought that the use of room temperature water results in local cooling in regions of the slurry at the places where the room temperature water is added. As such, these places may be reaching a temperature far below the overall average temperature of the slurry.

The results suggest that air compression filters can improve the purification of the PG by providing the formation of a sediment layer not more than 5-7 mm at temperatures of about 120° C. The results also suggest that the use of boiling water to dilute the slurry or wash the cake after filtering can improve PG purification by keeping the temperature of the cake or slurry at about 100° C. or greater. The results suggest that filters can be designed to accommodate continuous filtration of the reaction slurry with subsequent washing and/or dilution of the filtered slurry that provides a sediment layer of not more than about 5-7 mm while maintaining the temperature of the mixture and filtrate at about 100° C. or greater. Such filters can employ air compression filters as described here, vacuum drum filters with flushing, and/or belt filter-press operating continuously. Others will be appreciated by those of skill in the art.

Example 12: Manufacture and Testing of Gypsum Samples

The filter cake from Example 11 was quickly removed from the filter into a pre-heated two-shift horizontal mixer-neutralizer. Here, the hot hemihydrate slurry was mixed with the addition of about 5% calcium oxide and thoroughly mixed. During vigorous stirring of the filtered slurry, the added free lime hydrated and neutralized residual phosphate anions. The obtained calcium hydroxide was observed to significantly improve the plasticity of the mixture. While not being bound to theory, it is thought that the formation of an electrical charged on the particle surface resulted in the lubrication effect.

The mixtures with a creamy consistency were cast into pre-heated cube molds and subjected to vibration for about 3 minutes. The mixtures with a semi-dry consistency were subjected to vibration under a load. The cubes made of semi-dry mixes were often clumsy because of the imperfection of the process, while the cubes manufactured from the mixes of creamy consistency demonstrated a perfect finish.

Samples of dried and hardened gypsum had a density of about 1.1 to about 1.5 g/cm$^3$, which corresponded to a WB from about 0.88 to about 1.7 and had a compressive strength of about 4.8 to about 31 MPa. While not being bound to theory, it is thought that after improving the filtration process of the hemihydrate slurry and the quality of mixing/casting/vibropressing stages of manufacture of gypsum samples, the strength of 60 MPa and higher can be achieved.

Example 13: Purification of Filtrate Solution from Radioactive Contaminants

It was observed that a small amount of fine PG particles penetrated through the triple layer of the filter, which was made of cotton of medium density. The filtrate solution had a rich green color, which was observed to significantly brighten after cooling at room temperature and standing aside for about 5-24 hours while the thin layer formed on top of the sediment became dark gray-green.

Preliminary measurements of $^{226}$Ra concentration in the cooled filtrate after settling was about 20 Bq/kg and was about 4,500 Bq/kg in the dark upper layer of the sediment. While not being bound to theory, high $^{226}$Ra concentrations can be explained by the absorption of radium sulfate with extremely low solubility by the fine particles that form the top part of the sediment. This observation supports the idea that this can be an effective method of concentrating radioactive contaminants after purification of PG. Another method of concentrating the radioactive contaminants can be to use their absorption in zeolites that are either of natural or synthetic origin. The theoretical capacity to absorb contaminants is high, up to about 30% by weight of heavy, including rare earth metals.

Example 14: Examination of Circulating CaCl$_2$ Solution Parameters for Purification of PG The studies described in this Example focus on the examination of the filtration of the PG suspension and washing out of the hemihydrate slurry "cake" on the filter and discuss the influence of absorbents for the deposition of heavy metals and radioactive elements. These impurities are in the circulating solution in the pool for cooling and sedimentation of the fine fraction of PG (See also Example 13). One objective of this research was to examine the quantitative parameters of the circulating solution of calcium chloride used for purification of PG from heavy and radioactive metal salts.

For the rational use of energy of flue gases and to shorten the time of heating the PG slurry, the diluted solution in the pool for sedimentation and cooling should retain a sufficiently high temperature (about 60° C. to 80° C.) and be relatively free from heavy and radioactive elements. These objectives are at odds with each other as it is known that absorption is enhanced as the temperature decreases. Purification of the circulating solution from the metal cations in the adsorption process can take place on the surface of the dispersed solid phase in case of the fine fraction of PG and/or by absorption within the structure of zeolite minerals. However, each type of adsorbent material has its own adsorptive properties dependent on temperature.

To estimate the absorption properties of different substances, direct measurements of the initial and residual activity concentrations of $^{226}$Ra at the temperatures ranging from about 100° C. to about 20° C. In short, ions of heavy metal and radioactive metal salts were removed from PG in about 40% solution of $CaCl_2$, according to methods described herein. The resulting solution was filtered, diluted to 15% (boiling point 103° C., density 1.136 kg/L) and allowed to settle at about 100° C. up until complete settling of the solid phase. Part of the complete solution was placed in a Petri dish where the initial $^{226}$Ra activity concentration was measured. Next, the solution was divided into 5 equal parts by mass and bottled and tightly closed in 500 mL glass jars. The jars were heated to about 100° C. in a chamber equipped with a digital thermostat. Then 1 gram of different absorbents that belong to the family of zeolites were added to each of the jars, with a different zeolite being added to each jar. The resulting suspension was stirred and incubated for about 1 day at about 100° C. The $^{226}$Ra activity concentration was then measured.

The resulting $^{226}$Ra activity concentration in the solution settled at about 100° C. was extremely low and therefore inappropriate by the requirements of sensitivity and uncertainty of measurements for evaluating the absorption properties of the zeolite absorbents. Having concluded that there was an excellent absorption capacity of the fine fraction of PG passed through the filter high temperatures, it was decided to use this observation to simplify and reduce the cost of technology for removal of heavy metals and radioactive elements to protect the environment.

In parallel, the comparison between two different regimes of filtering the slurry was carried out. The first regime (Filtration method A) included: 1) displacement of a concentrated solution (about 40% calcium chloride) with compressed air from the suspension through the filter cloth under pressure of about 2-4 bars at a temperature of about 120° C. to about 140° C.; and 2) re-filling of the "cake" by boiling water (about 100° C.) and repeated displacement of water with salt residues washed out. The second regime (Filtration method B) included filtering the concentrated solution without the use of compressed air and boiling water was poured fourfold without damaging the "cake" after filtration and resulted in a final concentration of solution of about 15%.

The initial $^{226}$Ra activity concentration in the raw PG obtained in the dry method of production was about 664.9±34 Bq/kg, while in the purified PG only about 31.4±8.1 Bq/kg was observed. The $^{226}$Ra activity concentration of the fine PG fraction that passed through the filter and absorbed heavy metals and Ra was equal to about 5,256 Bq/kg in the Marinelli beaker.

After filtering using Filtration Method A, the solution containing the precipitate was settled for about 2 hours at 100° C. in the heat chamber. Before sampling, the clarified layer from the top of the settled solution was removed using a pipet and the removed sample was placed in a Petri dish for radioactivity measurement. The measurement of radioactivity was immediately taken and the duration of test was about 3,600 seconds. The sample tested was returned to the initial glass jar and the contents of the jar were mixed. This cycle was repeated for the next portions of the purified solution, which were sampled and measured for radioactivity. The measurement results were stabilized in 1.5-2.0 days of storing at about 100° C. The results are demonstrated in Table 6, which demonstrates the effect of the radioactivity of the solution containing the fine fraction of PG on the presence time at 100° C. and after subsequent cooling to room temperature (about 18-20° C.).

TABLE 6

| Time (h) | $^{226}$Ra activity concentration, Bq/Kg | Temperature ° C. |
|---|---|---|
| 2 | 31.4 | 100 |
| 3 | 21.6 | 100 |
| 28 | 7.4 | 100 |
| 36 | 5.8 | 100 |
| 48 | 5.8 | 100 |
| 48 h at 100° C. + 24 | 1.9 | 100/18-20 |

The influence of the presence time at 100° C. was observed. While not being bound to theory, this may be due to the differing rates of diffusion through the solution and the precipitate, which depends on the solution temperature. The main result observed was that the fine fraction of PG acts as a strong adsorbent for Ra and other heavy metals, which leaves little opportunity to obtain a strong enough Ra salt solution without applying special measures. It is also demonstrated that the fine fraction of PG can act as an efficient Ra absorbent.

PG was also filtered according to Filtration method B. Again, the main difference between Filtration method A and B was the rate of filtration.

After filtering, the solution containing the precipitate was settled for about 2 hours at 100° C. in the heat chamber. Before sampling, the clarified layer from the top of the settled solution was removed using a pipet and the removed sample was placed in a Petri dish for radioactivity measurement. The measurement of radioactivity was immediately taken and the duration of test was about 3,600 seconds. The sample tested was returned to the initial glass jar and the contents of the jar were mixed. This cycle was repeated for the next portions of the purified solution, which were sampled and measured for radioactivity. After stabilization of radioactivity of the 15% solution in time, the samples were removed from the heat chamber and stored at room temperature for about 24 hours.

After filtration by method B, the treated PG product contained a similar $^{226}$Ra activity concentration to the raw PG. The $^{226}$Ra activity concentration of PG product after purification by method B was about 694±29.7 Bq/kg. In parallel, $^{226}$Ra activity concentration measurements of the precipitate that passed through the filter and absorbed heavy metals and Ra (fine PG fraction) were taken. The fine PG fraction here had a $^{226}$Ra activity concentration of about 351.8 Bq/kg. The full results are demonstrated in Table 7.

TABLE 7

| Time (h) | $^{226}$Ra activity concentration (Bq/kg) | Temperature (° C.) |
|---|---|---|
| 2 | 29.0 | 100 |
| 3.5 | 20.2 | 100 |
| 28 | 12.6 | 100 |
| 36 | 7.1 | 100 |
| 48 | 5.3 | 100 |
| 48 h at 100° C. + 24 h at room temperature | 2.7 | 100/18-20 |

The results in this Example demonstrate that rate of filtration can affect the purification of Ra from PG despite the kinetics of the process of absorbing Ra and heavy metals on the surface of PG being similar. While not being bound to theory, it may be that without out compressed air and a slower rate of filtration in Method B, the tight filter missed the fine fraction making slow filtration not as effective as the fast filtration of Method A. It may also have been due to the slower removal of the filtrate from the slurry in Method B, which allowed the precipitate to absorb low amounts of heavy metals and Ra, which was extracted from the PG during processing. Further, the results demonstrate that washing the filtered chemically-treated PG at hot (at least 100° C.) temperatures, avoiding cooling of the slurry at transfer from the reactor (T=120° C. to 125° C.) to the filter, and quickly and vigorously filtering the slurry can improve purification of PG.

Example 15: Phosphogypsum Purification at Ambient Temperature

The studies in this Example focus on the purification of PG by reacting PG with a concentrated calcium chloride solution at about ambient temperatures.

Figure 16A:
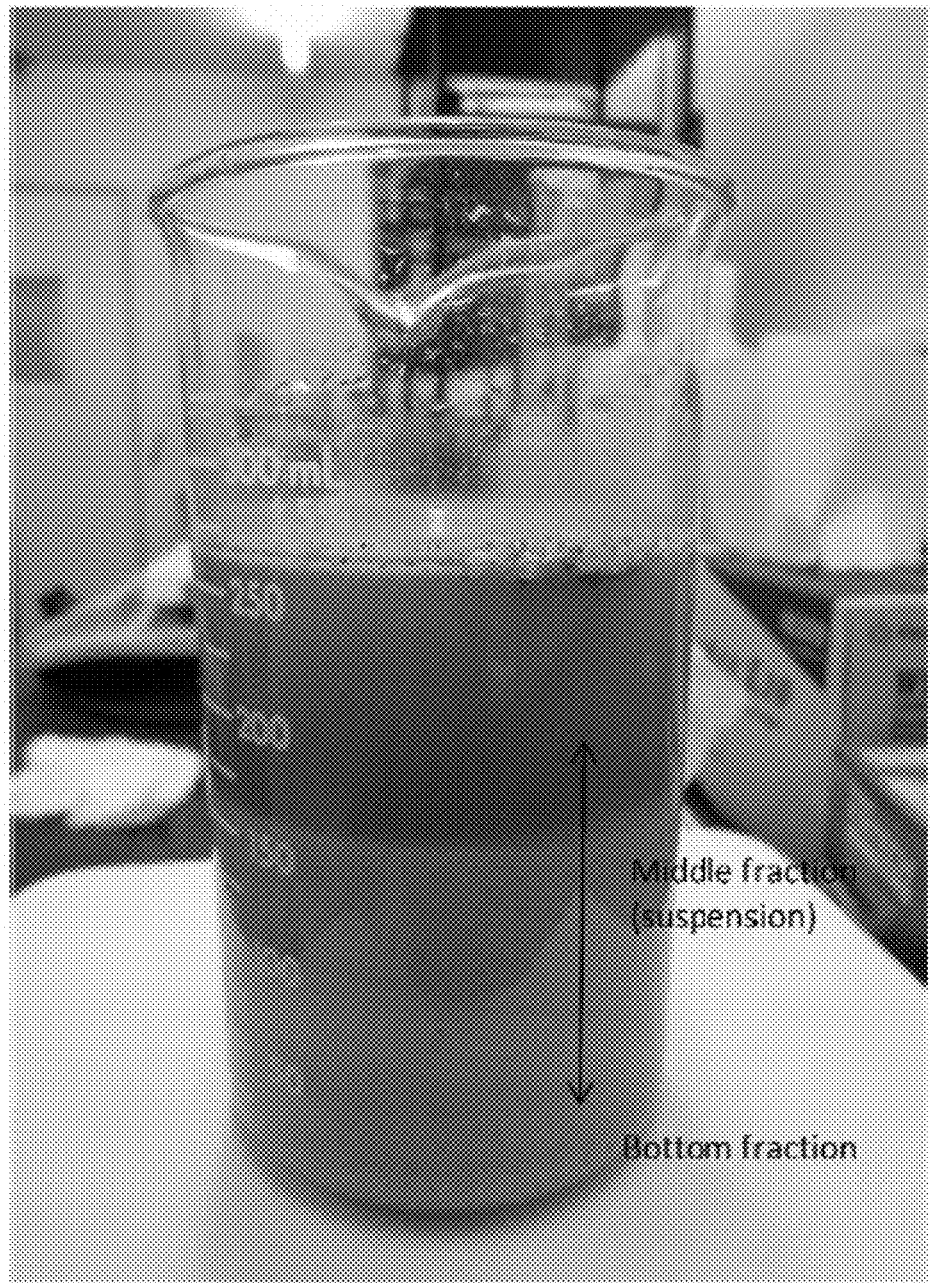
FIG. 16A-16B demonstrate LA PG reacted in about 40% $CaCl_2$ (dihydrate) at about 30° C. with low stirring (FIG. 16A) followed by settling (FIG. 16B).
Figure 16B:
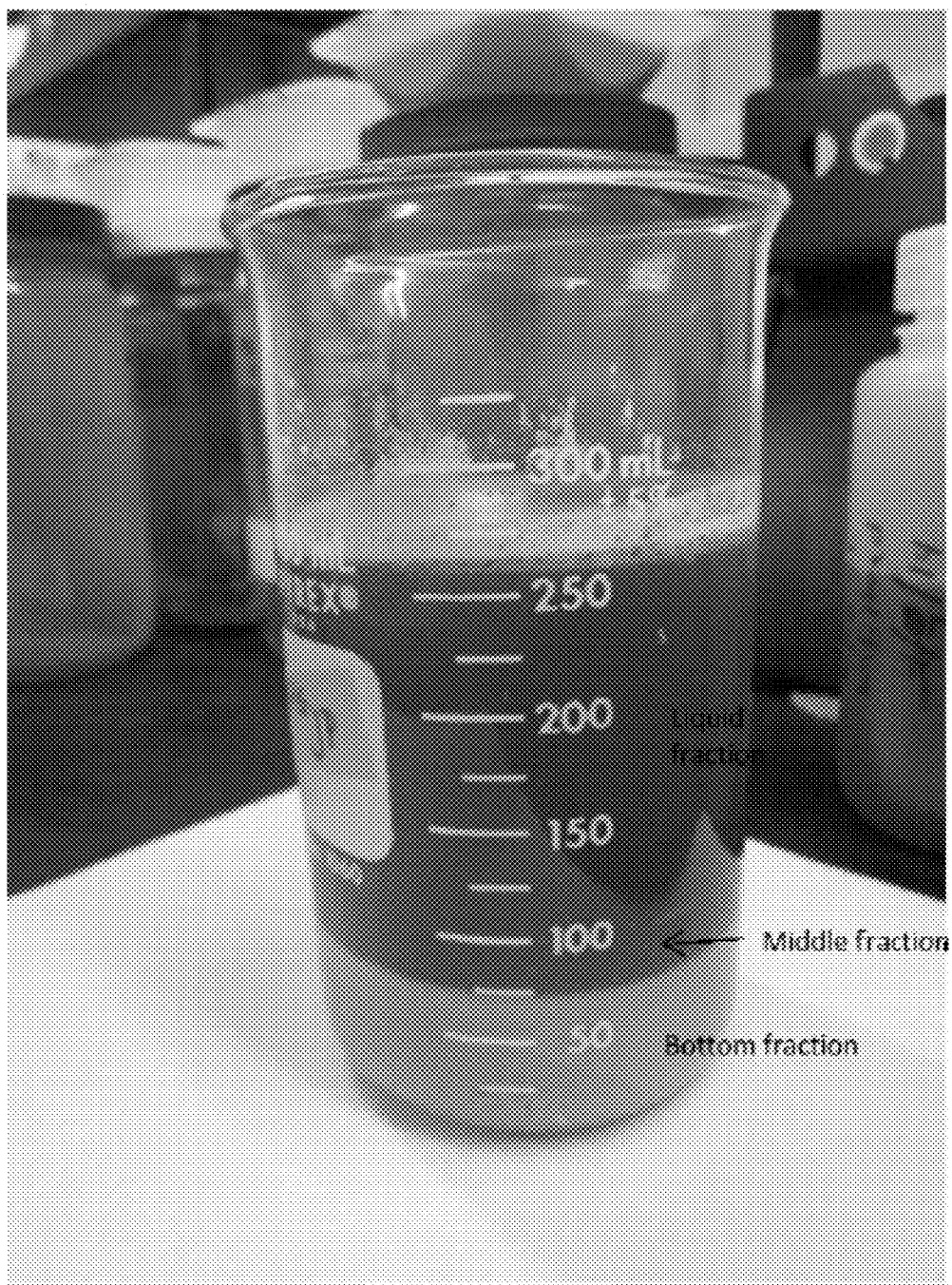
Figure 17A:
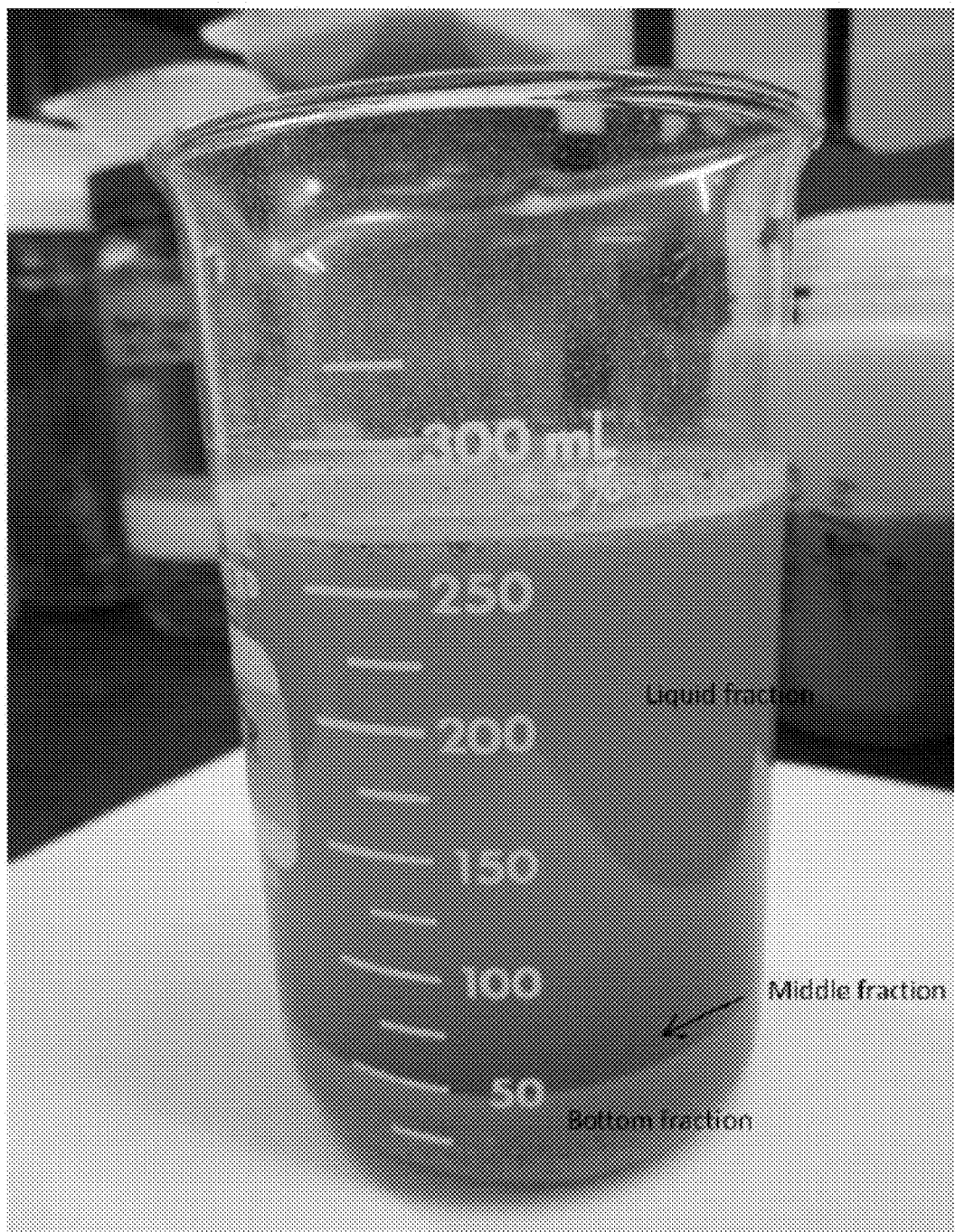
FIG. 17A-17B demonstrate LA PG reacted in about 40% $CaCl_2$ (dihydrate) at about 30° C. with low stirring (FIG. 16A) followed by settling (FIG. 16B).
Figure 17B:
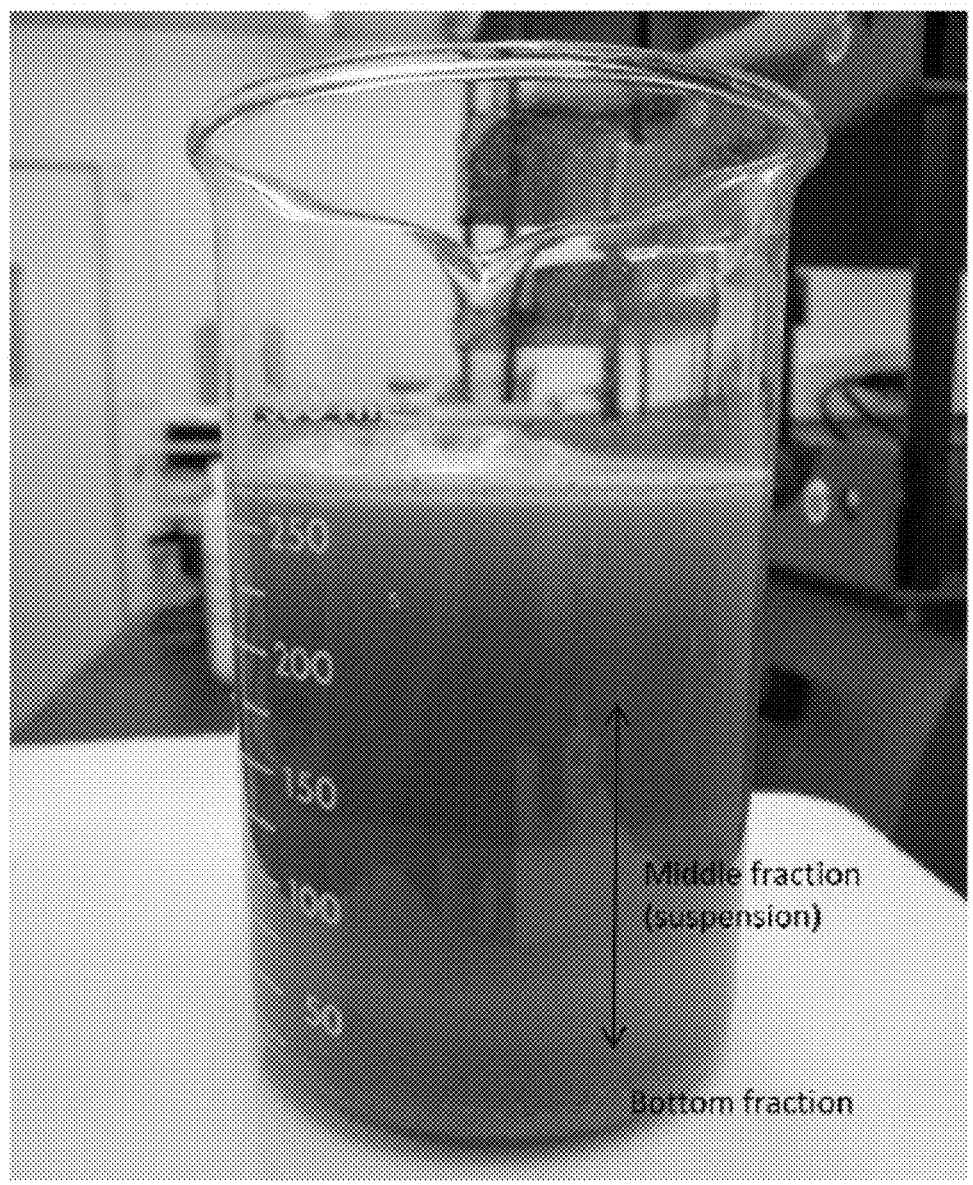

Two PG samples (Rotem PG and LA PG) were reacted in a concentrated chloride solution (about 40% calcium chloride dihydrate) at about 30° C. The solution was stirred at a low speed (about 120 rpm) for about 2 h and then settled for about 6 h. This is demonstrated in FIGS. 16A-16B (Rotem PG) and 17A-17B (LA PG). FIGS. 16B and 17B were obtained after about 4 h of settling. As demonstrated in FIGS. 16B and 17B, three fractions were visible: a liquid fraction, a fine solid fraction, and a coarse solid fraction. The liquid fraction was removed from the solid fractions via pipetting. The pH and conductivity of the liquid fraction was measured. The two solid fractions (fine and coarse) were separated, washed with a saturated $CaSO_4$ solution, and then dried at about 55° C. in an oven for about 48 h. The nomenclature for the resulting fractions is set forth in Table 8. The mass of the recovered fractions is demonstrated in Table 9 (Rotem PG) and Table 10 (LA PG).

TABLE 8

| Nomenclature | Fraction |
| --- | --- |
| RPG-L-A | Rotem liquid fraction replicate A |
| RPG-L-B | Rotem liquid fraction replicate B |
| RPG-M-A | Rotem middle fraction (fine solids) replicate A |
| RPG-M-B | Rotem middle fraction (fine solids) replicate B |
| RPG-B-A | Rotem bottom fraction (coarse solids) replicate A |
| RPG-B-B | Rotem bottom fraction (coarse solids) replicate B |
| LAPG-L-A | Louisiana liquid fraction replicate A |
| LAPG-L-B | Louisiana liquid fraction replicate B |
| LAPG-M-A | Louisiana middle fraction (fine solids) replicate A |
| LAPG-M-B | Louisiana middle fraction (fine solids) replicate B |
| LAPG-B-A | Louisiana bottom fraction (coarse solids) replicate A |
| LAPG-B-B | Louisiana bottom fraction (coarse solids) replicate B |

TABLE 9

| Replicate ID | RPG-L Mass of liquid fraction (g) | RPG-M Dry Mass of fine solids (g) | RPG-B Dry mass of coarse solids (g) | Total dry Mass (g) | RPG-M % of Total dry mass | RPG-B % of Total dry mass |
| --- | --- | --- | --- | --- | --- | --- |
| RPG-A | 225 | 1.26 | 36.24 | 37.50 | 3.4% | 96.6% |
| RPG-B | 231 | 0.92 | 35.34 | 36.26 | 2.5% | 97.5% |

TABLE 10

| Replicate ID | LAPG-L Volume of liquid fraction (mL) | LAPG-M Dry Mass of fine solids (g) | LAPG-B Dry mass of coarse solids (g) | Total dry Mass (g) | LAPG-M % of Total dry mass | LAPG-B % of Total dry mass |
| --- | --- | --- | --- | --- | --- | --- |
| LAPG-A | 241 | 2.62 | 34.28 | 36.90 | 7.1% | 92.9% |
| LAPG-B | 237 | 1.17 | 35.50 | 36.67 | 3.2% | 96.8% |

An analysis of all three fractions was obtained using an Ortec germanium detector. Briefly, about 100 g of each sample was placed in a 250 mL Thermo Fisher wide-mouth jar and sealed with electrical tape. All the solid fractions weighed less than 100 g. Therefore to obtain a test sample size, the mass of the solid fractions was brought to a total mass of about 100 g using sugar. The sample was allowed to equilibrate in the jar for about two-weeks. Count time was set 4$h$ for the coarse solid fraction samples and for 48 h for the liquid and fine solid fraction samples. The summary of activity in the samples is demonstrated in FIGS. 18A and 18B.

The solid fractions were then dissolved in 2N Optima grade nitric acid (liquid to solid ration of 10 mass/mass) to a pH of 2 and tumbled for about 24 h. The samples were then filtered through a syringe with a 0.45 μm filter. Conductivity and pH measurements were obtained and recorded. The extracts were then analyzed on an inductively-coupled plasma optical emission spectrometer (ICP-OES) for major elements and on an inductively-coupled plasma mass spectrometer (ICP-MS) for trace elements. A summary of the concentration data is given in FIGS. 19A-19B.

Figure 20A:
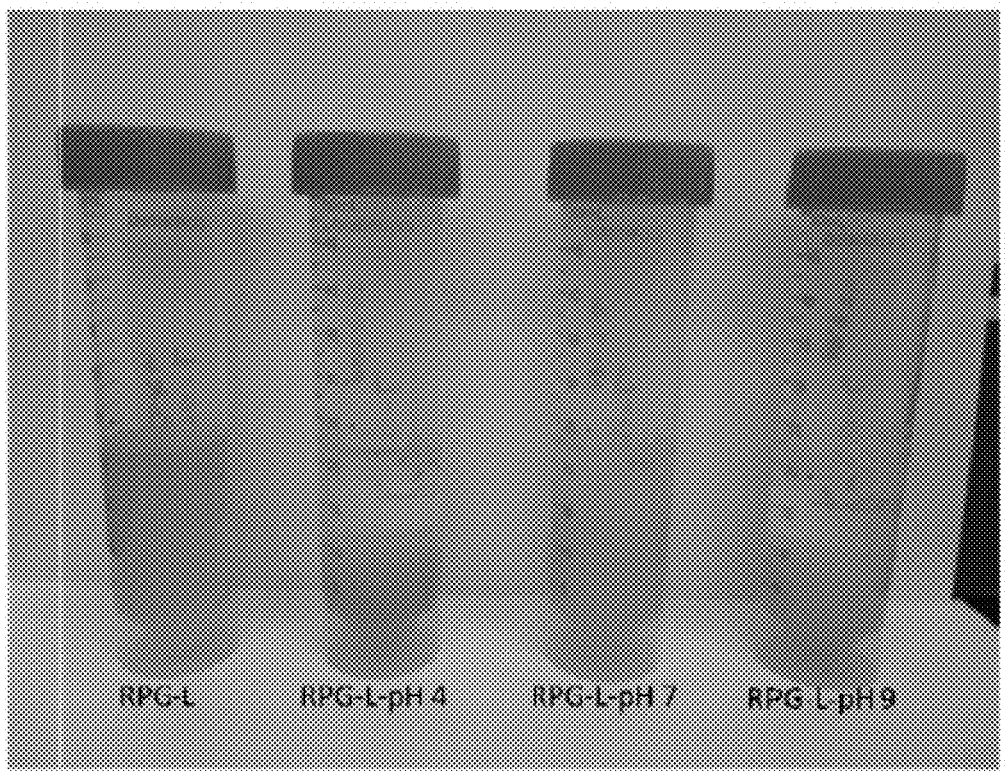
FIGS. 20A and 20B demonstrate liquid fractions that were separated into three 20-mL aliquots and neutralized with 1N sodium hydroxide to a pH of about 4, about 7, and about 9, in FIGS. 20A (Rotem PG) and 20B (LA PG).
Figure 20B:
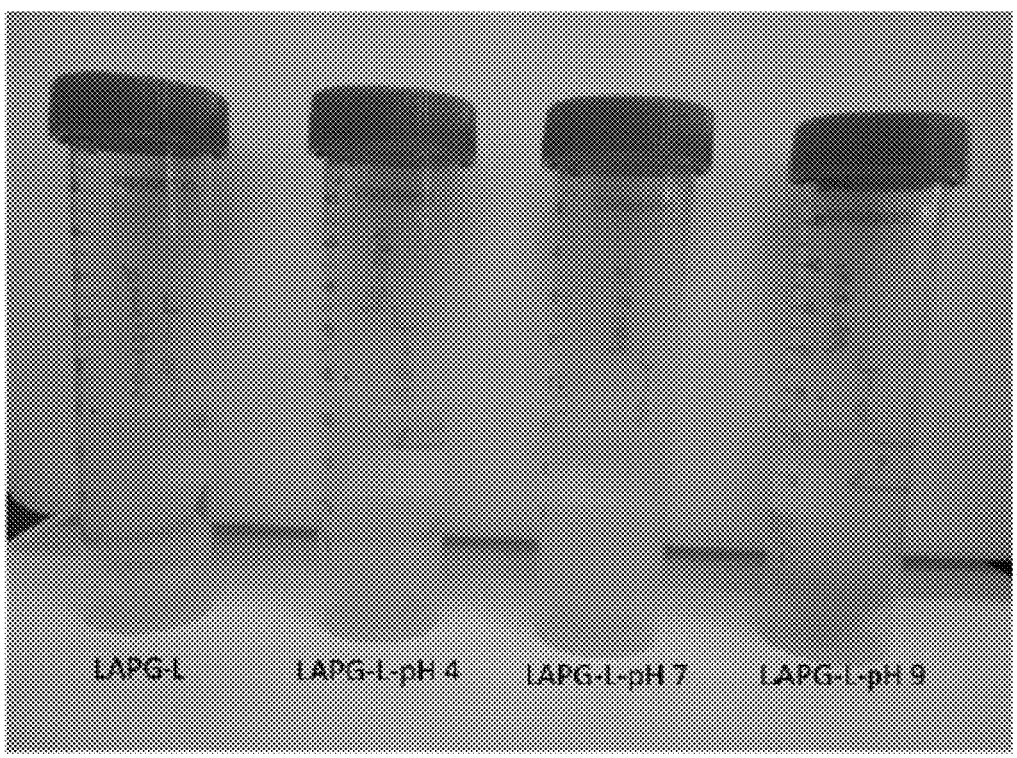
Figure 22A:
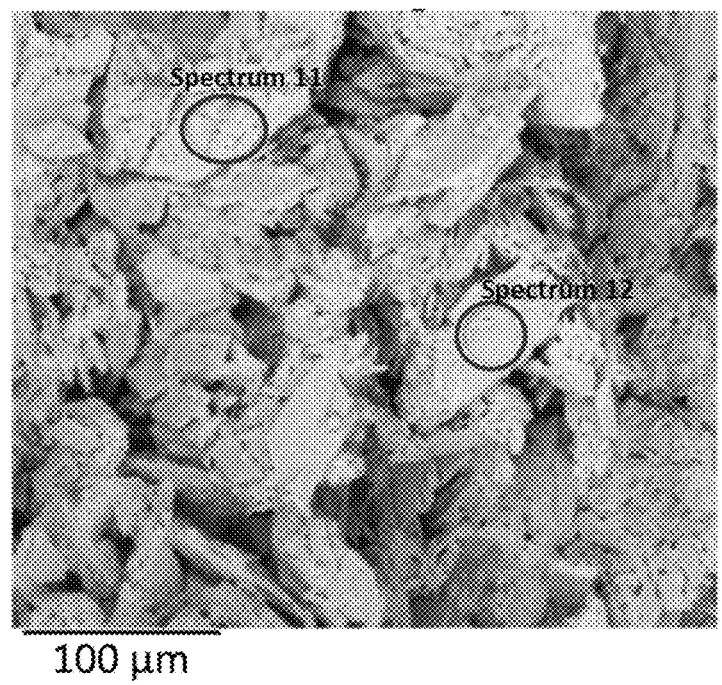
FIGS. 22A-22B demonstrate an environmental SEM image (FIG. 22A) and the EDS spectra of RPG-coarse solid fraction. Bar in FIG. 22A represents 100 µm.
Figure 22B:
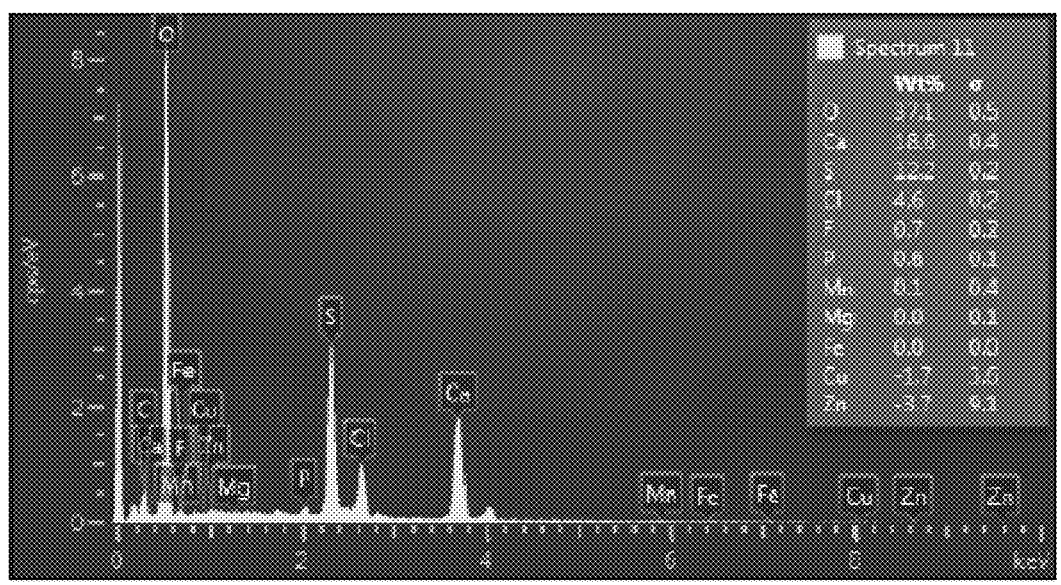
Figure 23A:
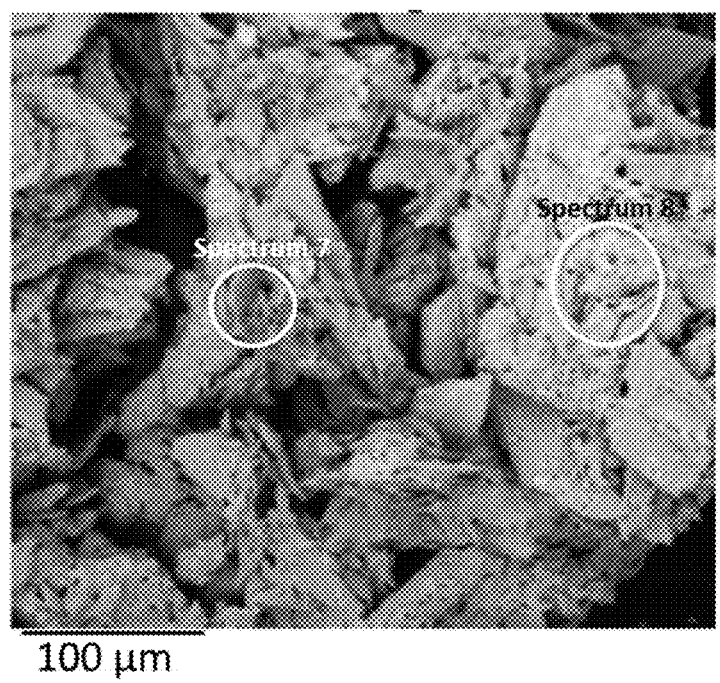
FIGS. 23A-23B demonstrate an environmental SEM image (FIG. 23A) and the EDS spectra of LAPG-coarse solid fraction. Bar in FIG. 23A represents 100 µm.
Figure 23B:
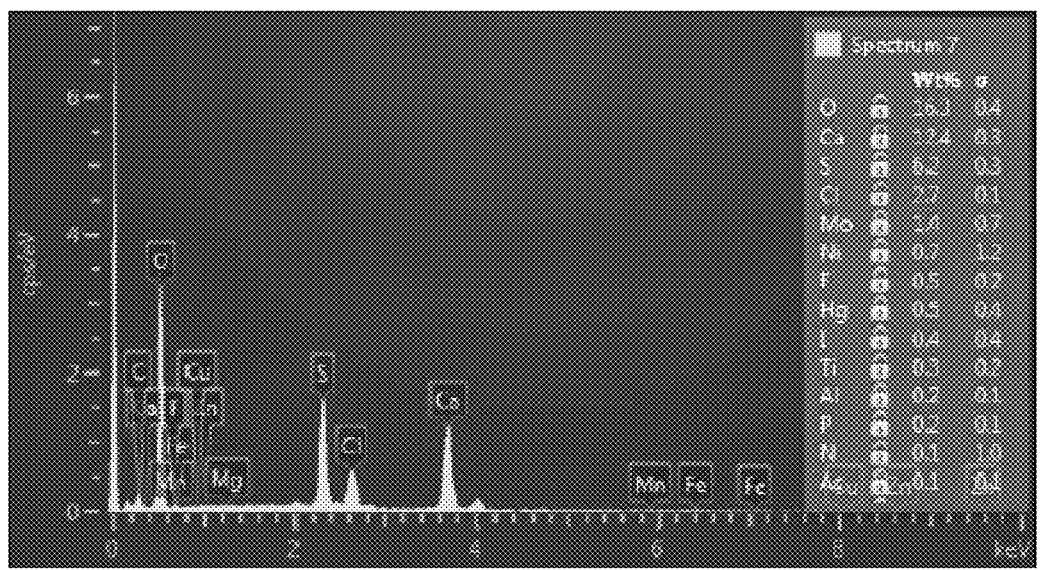
Figure 24A:
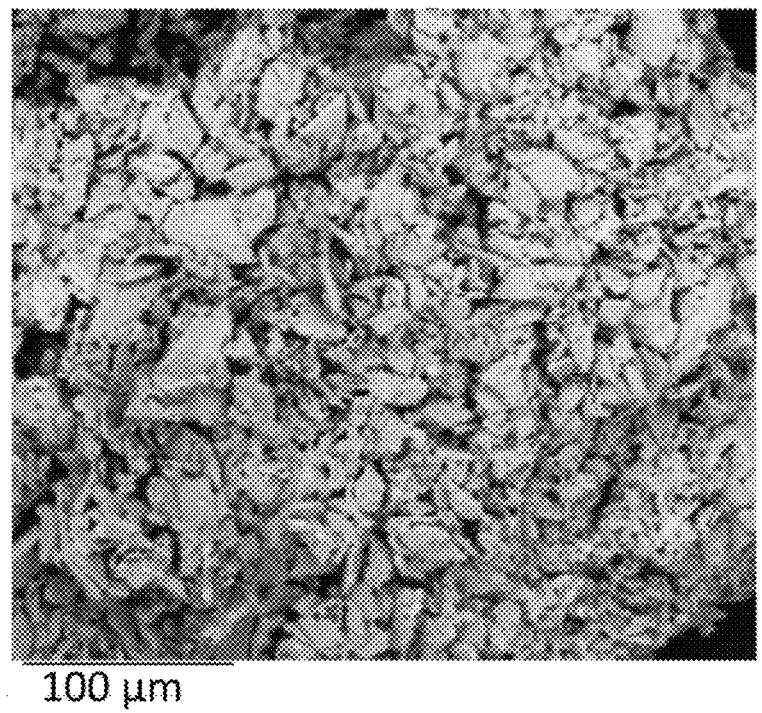
FIGS. 24A-24B demonstrate an environmental SEM image (FIG. 24A) and the EDS spectra of LAPG-fine solid fraction. Bar in FIG. 24A represents 100 µm.
Figure 24B:
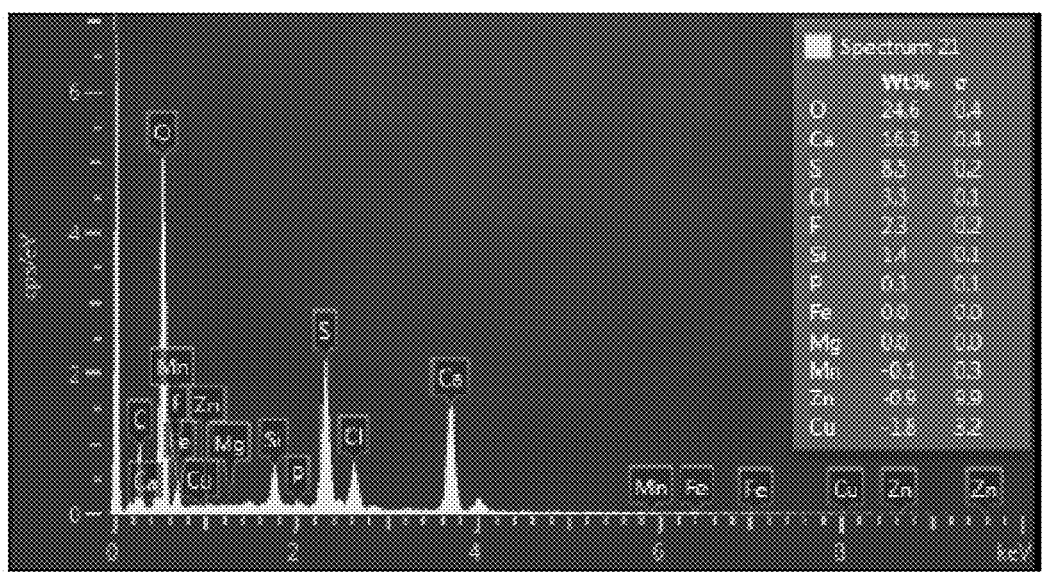
Figures 25A, 25B:
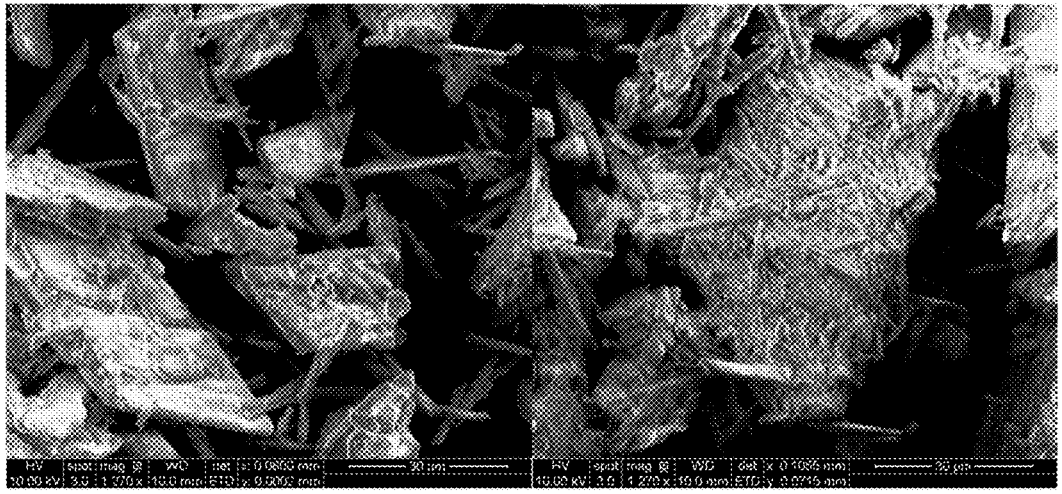
FIGS. 25A-25E demonstrate SEM images of PG purified by reacting PG with a concentrated calcium chloride (about 40% dihydrate) solution at about 30° C.
Figures 25C, 25D:
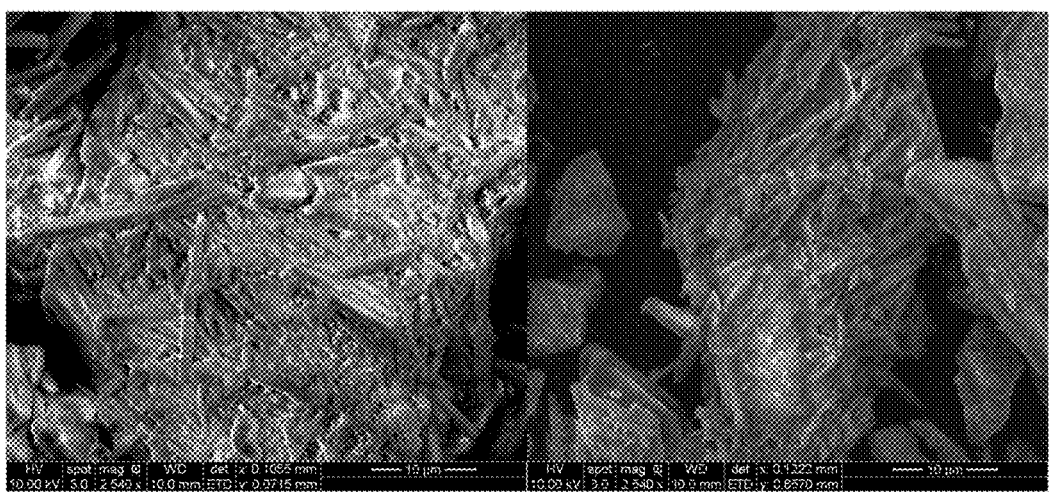
Figure 25E:

The liquid fraction was separated into three 20-mL aliquots and neutralized with 1N sodium hydroxide to a pH of about 4, about 7, and about 9, as demonstrated in FIGS. 20A (Rotem PG) and 20B (LA PG). The extracts remained in solution for about 24 hours and then were filtered and processed for ICP-OES and ICP-MS analyses. A summary of the concentration data from these analyses is demonstrated in FIGS. 21A (Rotem PG) and 21B (LA PG).

The solid fractions were mounted on carbon tape and analyzed on an environmental scanning microscope (SEM). The SEM images and corresponding energy dispersive x-ray spectroscopy (EDS) spectra for RPG-coarse solids, LAPG-coarse solids, and LAPG-fine solids are demonstrated in FIGS. 22A-24B. No sample was measured using these techniques for RPG fine solids.

The invention claimed is:

1. A system for removing impurities from phosphogypsum (PG), the system comprising:
    a ball drum mill configured for reacting a chloride solution and PG at a temperature between about 85° C. to about 150° C. to produce a PG reaction slurry;
    a reaction pool configured for dehydrating said PG reaction slurry at a temperature between about 85° C. to about 150° C., wherein the reaction pool is in fluid connection with the ball drum mill;

a filter configured to separate a solid fraction containing an alpha-hemihydrate gypsum crystal from a liquid waste fraction of said PG reaction slurry, wherein the filter is in fluid connection with the reaction pool, wherein the filter is configured to maintain temperature of the solid and liquid fractions; and a neutralization mixer configured for mixing the solid fraction with calcium oxide to neutralize the solid fraction, wherein the neutralization mixer is in fluid connection with the filter and wherein the neutralization mixer is configured to maintain temperature of the solid fraction.

2. The system of claim 1, wherein the reaction pool further comprises a cathode and an anode for galvanic removal of impurities from the PG reaction slurry.

3. The system of claim 1, further comprising a scrubber configured for purifying vapors produced in the ball drum mill, wherein the scrubber is in fluid connection with the ball drum mill.

4. The system of claim 3, further comprising a neutralization pool configured for mixing lime and/or carbonate powder with contents received from the scrubber, wherein the neutralization pool is in fluid connection with the scrubber.

5. The system of claim 1, further comprising a molecular sieve selected from the group consisting of a zeolite, a silica gel, an ion-exchange resin, or combinations thereof, wherein the molecular sieve is in fluid connection with the filter.

6. The system of claim 1, further comprising a container comprising said chloride solution, wherein the chloride solution is at a concentration of about 15% to about 20%, and wherein the container is in fluid connection with the filter.

7. The system of claim 1, further comprising a vibrating screen configured for filtering physical debris from a solution containing PG, wherein the vibrating screen is in fluid connection with the ball drum mill.

8. The system of claim 1, further comprising a streamed mixer configured for mixing a solution comprising chloride with PG, wherein the streamed mixer is in fluid connection with the vibrating screen.

9. The system of claim 8, further comprising a gravimetric feeder for weighing and delivering PG to the streamed mixer, wherein the gravimetric feeder is operatively coupled to the streamed mixer.

10. The system of claim 1, wherein the chloride solution comprises $CaCl_2$.

* * * * *